United States Patent
Arise et al.

(10) Patent No.: US 11,158,907 B2
(45) Date of Patent: *Oct. 26, 2021

(54) NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Toshihiko Ogata, Osaka (JP); Kosuke Kurakane, Osaka (JP); Junji Suzuki, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,111

(22) Filed: Dec. 18, 2018

(65) Prior Publication Data
US 2019/0189993 A1 Jun. 20, 2019

(30) Foreign Application Priority Data
Dec. 19, 2017 (JP) .............................. JP2017-243278

(51) Int. Cl.
| | |
|---|---|
| *H01M 2/16* | (2006.01) |
| *H01M 50/449* | (2021.01) |
| *H01M 4/583* | (2010.01) |
| *H01M 4/48* | (2010.01) |
| *H01M 10/0525* | (2010.01) |

(Continued)

(52) U.S. Cl.
CPC ......... *H01M 50/449* (2021.01); *H01M 4/483* (2013.01); *H01M 4/525* (2013.01); *H01M 4/583* (2013.01); *H01M 10/0525* (2013.01); *H01M 50/409* (2021.01); *H01M 50/411* (2021.01);

(Continued)

(58) Field of Classification Search
CPC .............................. H01M 2/16; H01M 2/1686
See application file for complete search history.

(56) References Cited

U.S. PATENT DOCUMENTS

| | | |
|---|---|---|
| 3,931,446 A | 1/1976 | Murayama et al. |
| 4,923,650 A | 5/1990 | Antoon, Jr. et al. |

(Continued)

FOREIGN PATENT DOCUMENTS

| | | |
|---|---|---|
| CN | 1041167 A | 4/1990 |
| CN | 1322021 A | 11/2001 |

(Continued)

OTHER PUBLICATIONS

Office Action dated Mar. 12, 2019 in JP Application 2017-243278 (partial translation).

(Continued)

*Primary Examiner* — Amanda C. Walke
(74) *Attorney, Agent, or Firm* — Panitch Schwarze Belisario & Nadel LLP

(57) ABSTRACT

A nonaqueous electrolyte secondary battery includes: a separator including a polyolefin porous film; a porous layer containing a polyvinylidene fluoride-based resin; and a positive electrode plate and a negative electrode plate for each of which the result of a scratch test in the width direction and the result of a scratch test in the flow direction are each within a predetermined range, the polyvinylidene fluoride-based resin containing an α-form polyvinylidene fluoride-based resin in an amount of not less than 35.0 mol %.

6 Claims, 1 Drawing Sheet

(51) Int. Cl.
  *H01M 4/525* (2010.01)
  *H01M 50/409* (2021.01)
  *H01M 50/411* (2021.01)
  *H01M 4/587* (2010.01)

(52) U.S. Cl.
  CPC ........ *H01M 4/587* (2013.01); *H01M 2220/30* (2013.01)

(56) References Cited

U.S. PATENT DOCUMENTS

| | | | |
|---|---|---|---|
| 5,008,296 A | 4/1991 | Antoon, Jr. et al. | |
| 5,011,698 A | 4/1991 | Antoon, Jr. et al. | |
| 5,051,183 A | 9/1991 | Takita et al. | |
| 5,571,634 A | 11/1996 | Gozdz et al. | |
| 6,395,419 B1 | 5/2002 | Kuwahara et al. | |
| 7,208,555 B2 | 4/2007 | Tada et al. | |
| 7,255,957 B2 | 8/2007 | Takahashi et al. | |
| 8,931,647 B2* | 1/2015 | Shiki | C08J 5/18 210/500.42 |
| 9,508,975 B1 | 11/2016 | Matsuo | |
| 9,876,210 B2 | 1/2018 | Ogata et al. | |
| 10,074,840 B2 | 9/2018 | Honda et al. | |
| 10,319,973 B2 | 6/2019 | Ogata et al. | |
| 10,361,418 B2 | 7/2019 | Ogata et al. | |
| 10,361,458 B2 | 7/2019 | Ogata et al. | |
| 10,367,182 B2 | 7/2019 | Ogata et al. | |
| 10,388,932 B2 | 8/2019 | Ogata et al. | |
| 10,461,297 B2 | 10/2019 | Ogata et al. | |
| 10,707,517 B2* | 7/2020 | Arise | H01M 2/1686 |
| 2002/0018936 A1 | 2/2002 | Suzuki et al. | |
| 2002/0136887 A1 | 9/2002 | Penneau et al. | |
| 2003/0031924 A1 | 2/2003 | Lee et al. | |
| 2003/0157314 A1 | 8/2003 | Penneau et al. | |
| 2003/0175494 A1 | 9/2003 | Penneau et al. | |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2009/0148685 A1 | 6/2009 | Kang et al. | |
| 2009/0200509 A1 | 8/2009 | Suzuki et al. | |
| 2010/0009265 A1 | 1/2010 | Hatayama et al. | |
| 2010/0123096 A1 | 5/2010 | Suzuki | |
| 2010/0167125 A1 | 7/2010 | Miyaki et al. | |
| 2010/0208177 A1 | 8/2010 | Kobayashi et al. | |
| 2010/0285341 A1 | 11/2010 | Yun et al. | |
| 2011/0027660 A1 | 2/2011 | Takeda et al. | |
| 2011/0212358 A1 | 9/2011 | Usami et al. | |
| 2011/0293989 A1 | 12/2011 | Hasegawa et al. | |
| 2011/0305940 A1 | 12/2011 | Usami et al. | |
| 2012/0028101 A1 | 2/2012 | Ishihara et al. | |
| 2012/0028102 A1 | 2/2012 | Ishihara et al. | |
| 2012/0028131 A1 | 2/2012 | Ishihara et al. | |
| 2012/0034518 A1 | 2/2012 | Ishihara et al. | |
| 2012/0034519 A1 | 2/2012 | Isriihara et al. | |
| 2012/0035285 A1 | 2/2012 | Noumi et al. | |
| 2012/0040232 A1 | 2/2012 | Ishihara et al. | |
| 2012/0135305 A1* | 5/2012 | Kim | H01M 4/1391 429/211 |
| 2012/0268072 A1 | 10/2012 | Okuno | |
| 2012/0308898 A1 | 12/2012 | Sawamoto et al. | |
| 2013/0071743 A1 | 3/2013 | Miyaki et al. | |
| 2013/0089770 A1 | 4/2013 | Nishikawa | |
| 2013/0089772 A1 | 4/2013 | Nishikawa | |
| 2013/0095365 A1 | 4/2013 | Nishikawa | |
| 2013/0164618 A1 | 6/2013 | Konishi | |
| 2013/0196208 A1 | 8/2013 | Nemoto | |
| 2013/0252056 A1 | 9/2013 | Ueki et al. | |
| 2013/0266831 A1 | 10/2013 | Motohashi et al. | |
| 2013/0319599 A1 | 12/2013 | Huang | |
| 2013/0337311 A1 | 12/2013 | Itou | |
| 2014/0050965 A1 | 2/2014 | Ha et al. | |
| 2014/0178741 A1 | 6/2014 | Hasegawa et al. | |
| 2014/0272505 A1 | 9/2014 | Yoon et al. | |
| 2014/0363726 A1 | 12/2014 | Honda et al. | |
| 2014/0377630 A1 | 12/2014 | Kawakami et al. | |
| 2015/0093647 A1* | 4/2015 | Kako | H01M 4/505 429/223 |
| 2015/0155541 A1 | 6/2015 | Hasegawa | |
| 2015/0180002 A1 | 6/2015 | Nishikawa et al. | |
| 2015/0188108 A1 | 7/2015 | Miyazawa et al. | |
| 2015/0236323 A1 | 8/2015 | Honda et al. | |
| 2015/0263325 A1 | 9/2015 | Honda et al. | |
| 2015/0280194 A1 | 10/2015 | Mitsuoka et al. | |
| 2015/0349312 A1 | 12/2015 | Ha et al. | |
| 2015/0372276 A1 | 12/2015 | Mizuno et al. | |
| 2016/0036027 A1 | 2/2016 | Nishikawa | |
| 2016/0118639 A1 | 4/2016 | Ishihara | |
| 2016/0181584 A1 | 6/2016 | Hatayama et al. | |
| 2016/0181593 A1 | 6/2016 | Jin et al. | |
| 2016/0233553 A1 | 8/2016 | Yamasaki et al. | |
| 2016/0268571 A1 | 9/2016 | Honda | |
| 2017/0012265 A1 | 1/2017 | Nakadate et al. | |
| 2017/0033347 A1 | 2/2017 | Murakami et al. | |
| 2017/0033348 A1 | 2/2017 | Murakami et al. | |
| 2017/0098809 A1* | 4/2017 | Ogata | H01M 2/1653 |
| 2017/0141373 A1 | 5/2017 | Murakami et al. | |
| 2017/0155113 A1* | 6/2017 | Hashiwaki | H01M 2/1686 |
| 2017/0155114 A1 | 6/2017 | Kurakane | |
| 2017/0155120 A1 | 6/2017 | Yoshimaru et al. | |
| 2017/0155121 A1 | 6/2017 | Ogata | |
| 2017/0162849 A1 | 6/2017 | Murakami et al. | |
| 2017/0170443 A1 | 6/2017 | Murakami et al. | |
| 2017/0263905 A1 | 9/2017 | Ogata et al. | |
| 2017/0279102 A1 | 9/2017 | Hasegawa et al. | |
| 2017/0341035 A1 | 11/2017 | Sato et al. | |
| 2017/0365831 A1 | 12/2017 | Ogata et al. | |
| 2017/0365832 A1 | 12/2017 | Ogata et al. | |
| 2017/0365833 A1 | 12/2017 | Ogata et al. | |
| 2017/0365834 A1 | 12/2017 | Ogata et al. | |
| 2017/0365835 A1 | 12/2017 | Ogata et al. | |
| 2017/0365836 A1 | 12/2017 | Ogata et al. | |
| 2017/0365878 A1 | 12/2017 | Ogata et al. | |
| 2018/0013118 A1 | 1/2018 | Kawakami et al. | |
| 2018/0083249 A1 | 3/2018 | Hasegawa et al. | |
| 2018/0261878 A1* | 9/2018 | Azami | H01M 4/661 |
| 2018/0301740 A1* | 10/2018 | Min | H01M 4/131 |
| 2018/0342720 A1 | 11/2018 | Kurakane | |
| 2019/0074539 A1* | 3/2019 | Shen | H01M 4/626 |
| 2019/0189993 A1 | 6/2019 | Arise et al. | |
| 2019/0190037 A1* | 6/2019 | Mizuno | H01M 2/16 |
| 2019/0334149 A1* | 10/2019 | Li | H01M 2/1653 |
| 2019/0386274 A1* | 12/2019 | Wood | H01M 2/145 |
| 2019/0393466 A1* | 12/2019 | Lin | H01M 2/1653 |
| 2020/0052269 A1* | 2/2020 | Taguchi | H01M 2/145 |
| 2020/0070470 A1 | 3/2020 | Yoshimaru et al. | |

FOREIGN PATENT DOCUMENTS

| | | |
|---|---|---|
| CN | 1362892 A | 8/2002 |
| CN | 1825666 A | 8/2006 |
| CN | 1933923 A | 3/2007 |
| CN | 101500696 A | 8/2009 |
| CN | 101516975 A | 8/2009 |
| CN | 101836138 A | 9/2010 |
| CN | 101983219 A | 3/2011 |
| CN | 102307944 A | 1/2012 |
| CN | 102339965 A | 2/2012 |
| CN | 102372856 A | 3/2012 |
| CN | 102651466 A | 8/2012 |
| CN | 103155219 A | 6/2013 |
| CN | 103155220 A | 6/2013 |
| CN | 103474601 A | 12/2013 |
| CN | 103477491 A | 12/2013 |
| CN | 104051776 A | 9/2014 |
| CN | 104241574 A | 12/2014 |
| CN | 105322120 A | 2/2016 |
| EP | 0834941 A1 | 4/1998 |
| JP | S51017274 A | 2/1976 |
| JP | H06104736 B2 | 12/1994 |

(56) References Cited

FOREIGN PATENT DOCUMENTS

| | | |
|---|---|---|
| JP | H09161778 A | 6/1997 |
| JP | H11016561 A | 1/1999 |
| JP | H11040129 A | 2/1999 |
| JP | H1186844 A | 3/1999 |
| JP | H11120994 A | 4/1999 |
| JP | H11130900 A | 5/1999 |
| JP | H11300180 A | 11/1999 |
| JP | 2001118558 A | 4/2001 |
| JP | 2001351616 A | 12/2001 |
| JP | 2002265658 A | 9/2002 |
| JP | 2004087209 A | 3/2004 |
| JP | 2005135659 A | 5/2005 |
| JP | 2005179562 A | 7/2005 |
| JP | 2005200623 A | 7/2005 |
| JP | 2005222773 A | 8/2005 |
| JP | 2005343957 A | 12/2005 |
| JP | 200666243 A | 3/2006 |
| JP | 2007048581 A | 2/2007 |
| JP | 2008062229 A | 3/2008 |
| JP | 2008123996 A | 5/2008 |
| JP | 4247027 B2 | 4/2009 |
| JP | 2009104967 A | 5/2009 |
| JP | 2009185093 A | 8/2009 |
| JP | 2009218198 A | 9/2009 |
| JP | 2009256404 A | 11/2009 |
| JP | 2009259605 A | 11/2009 |
| JP | 2010118312 A | 5/2010 |
| JP | 2010157361 A | 7/2010 |
| JP | 2010232088 A | 10/2010 |
| JP | 2010540744 A | 12/2010 |
| JP | 201177014 A | 4/2011 |
| JP | 4773064 B2 | 9/2011 |
| JP | 201276255 A | 4/2012 |
| JP | 2012104422 A | 5/2012 |
| JP | 2012150972 A | 8/2012 |
| JP | 5085581 B2 | 11/2012 |
| JP | 2012227066 A | 11/2012 |
| JP | 2012256528 A | 12/2012 |
| JP | 5164296 B2 | 3/2013 |
| JP | 2013046998 A | 3/2013 |
| JP | 2013171629 A | 9/2013 |
| JP | 5302456 B1 | 10/2013 |
| JP | 2013218875 A | 10/2013 |
| JP | 5355823 B1 | 11/2013 |
| JP | 2013234263 A | 11/2013 |
| JP | 5432417 B2 | 3/2014 |
| JP | 5553165 B2 | 7/2014 |
| JP | 2014213500 A | 11/2014 |
| JP | 2015111461 A | 6/2015 |
| JP | 2015120835 A | 7/2015 |
| JP | 2015122234 A | 7/2015 |
| JP | 5876616 B1 | 3/2016 |
| JP | 2016040354 A | 3/2016 |
| JP | 2016051695 A | 4/2016 |
| JP | 2016066755 A | 4/2016 |
| JP | 2016071969 A | 5/2016 |
| JP | 5932161 B1 | 6/2016 |
| JP | 6012838 B1 | 10/2016 |
| JP | 6025957 B1 | 11/2016 |
| JP | 6153992 B2 | 6/2017 |
| JP | 2017103041 A | 6/2017 |
| JP | 2017103042 A | 6/2017 |
| JP | 2017103046 A | 6/2017 |
| JP | 2017103204 A | 6/2017 |
| JP | 2017103209 A | 6/2017 |
| JP | 2017107848 A | 6/2017 |
| JP | 2017142917 A | 8/2017 |
| JP | 2017168419 A | 9/2017 |
| JP | 2017226117 A | 12/2017 |
| JP | 2017226120 A | 12/2017 |
| JP | 2017226121 A | 12/2017 |
| JP | 2017226122 A | 12/2017 |
| JP | 2017228404 A | 12/2017 |
| KR | 20060072065 A | 6/2006 |
| KR | 20060101541 A | 9/2006 |
| KR | 20060118668 A | 11/2006 |
| KR | 20090037552 A | 4/2009 |
| KR | 20120003864 A | 1/2012 |
| KR | 20120128612 A | 11/2012 |
| KR | 20130031319 A | 3/2013 |
| KR | 20130036043 A | 4/2013 |
| KR | 101430975 B1 | 8/2014 |
| KR | 20140112668 A | 9/2014 |
| KR | 20140113186 A | 9/2014 |
| KR | 20140114428 A | 9/2014 |
| KR | 101479749 B1 | 1/2015 |
| KR | 20150020667 A | 2/2015 |
| KR | 20150032555 A | 3/2015 |
| KR | 101510972 B1 | 4/2015 |
| KR | 20150083839 A | 7/2015 |
| KR | 20150119836 A | 10/2015 |
| KR | 20160002173 A | 1/2016 |
| KR | 20160014616 A | 2/2016 |
| KR | 20160016805 A | 2/2016 |
| KR | 20160038918 A | 4/2016 |
| KR | 20160094846 A | 8/2016 |
| KR | 20170031794 A | 3/2017 |
| TW | 201523980 A | 6/2015 |
| WO | 9859384 A1 | 12/1998 |
| WO | 2007119850 A1 | 10/2007 |
| WO | 2008018181 A1 | 2/2008 |
| WO | 2010089939 A1 | 8/2010 |
| WO | 2012090632 A1 | 7/2012 |
| WO | 2012137375 A1 | 10/2012 |
| WO | 2013073503 A1 | 5/2013 |
| WO | 2013099539 A1 | 7/2013 |
| WO | 2013133074 A1 | 9/2013 |
| WO | 2015099190 A1 | 7/2015 |
| WO | 2015141477 A1 | 9/2015 |
| WO | 2016104792 A1 | 6/2016 |
| WO | 2016152863 A1 | 9/2016 |

OTHER PUBLICATIONS

Office Action dated Jun. 10, 2020 in U.S. Appl. No. 16/223,737, by Arise.
Office Action dated Mar. 12, 2019 in JP Application No. 2017243282 (Partial Translation).
Office Action dated Apr. 3, 2018 in JP Application No. 2017-243282 (Partial Translation).
Office Action dated Oct. 2, 2018 in JP Application No. 2017-243282 (Partial Translation).
Dffice Action dated Dec. 30, 2019 in U.S. Appl. No. 16/223,737, by Arise.
Office Action dated Apr. 3, 2018 in JP Application 2017243278 (Partial English Translation).
Office Action dated Oct. 2, 2018 in JP Application 2017243278 (Partial English Translation).
International Search Report dated Jan. 10, 2017 in International Application No. PCT/JP2016/081481.
Martins et al., "Electroactive Phases of Poly(Vinylidene Fluoride): Determination, Processing, and Applications," Progress in Polymer Science, vol. 39, pp. 683-706 (2014).
Mohammadi et al., "Effect of Tensile Strain Rate and Elongation on Crystalline Structure and Piezoelectric Properties of PVDF Thin Films" Polymer Testing, vol. 26, pp. 42-50 (2007).
Office Action dated Jan. 13, 2020 in U.S. Appl. No. 15/989,901, by Kurakane.
Office Action dated Mar. 12, 2019 in JP Application No. 2017243286 (Partial English Translation).
Office Action dated Mar. 28, 2018 in CN Application No. 201610865635.7.
Office Action dated Apr. 3, 2018 in JP Application No. 2017243277 (Partial English Translation).
Office Action dated Apr. 3, 2018 in JP Application No. 2017243280 (Partial English Translation).
Office Action dated Apr. 3, 2018 in JP Application No. 2017243284 (Partial English Translation).
Office Action dated Apr. 3, 2018 in JP Application No. 2017243286 (Partial English Translation).

(56) References Cited

OTHER PUBLICATIONS

Office Action dated Apr. 3, 2018 in JP Application No. 2017243289.
Office Action dated Apr. 3, 2018 in JP Application No. 2017243292 (Partial English Translation).
Office Action dated Apr. 10, 2018 in JP Application No. 2017243293.
Office Action dated Apr. 10, 2018 in JP Application No. 2017243290 (Partial English Translation).
Office Action dated Apr. 10, 2019 in U.S. Appl. No. 15/627,585, by Ogata.
Office Action dated Apr. 19, 2017 in KR Application No. 1020160077240.
Office Action dated May 16, 2017 in JP Application No. 2017033720 (Partial English Translation).
Office Action dated Jun. 15, 2017 in U.S. Appl. No. 15/398,231, by Ogata.
Office Action dated Jun. 19, 2018 in KR Application No. 1020180060097.
Office Action dated Jun. 28, 2016 in JP Application No. 2016024163 (Partial English Translation).
Office Action dated Jul. 29, 2016 in KR Application No. 1020160077240.
Office Action dated Aug. 4, 2020 in U.S. Appl. No. 16/224,014, by Kashiwazaki.
Office Action dated Aug. 6, 2020 in U.S. Appl. No. 16/224,785, by Kurkane.
Office Action dated Aug. 13, 2020 in U.S. Appl. No. 16/224,788, by Arise.
Office Action dated Aug. 18, 2017 in KR Application No. 1020170041366.
Office Action dated Aug. 18, 2017 in KR Application No. 1020170041590.
Office Action dated Aug. 18, 2017 in KR Application No. 1020170041595.
Office Action dated Jun. 18, 2017 in KR Application No. 1020170041604.
Office Action dated Aug. 18, 2017 in KR Application No. 1020170041611.
Office Action dated Aug. 23, 2016 in JP Application No. 2016127005.
Office Action dated Aug. 29, 2019 in KR Application No. 1020197013298 (Partial English Translation).
Office Action dated Aug. 30, 2017 in CN Application No. 201611225799.X.
Office Action dated Sep. 20, 2018 in U.S. Appl. No. 15/627,629, by Ogata.
Office Action dated Sep. 28, 2016 in KR Application No. 1020160087266.
Office Action dated Oct. 2, 2018 in JP Application No. 2017243286 (Partial English Translation).
Office Action dated Oct. 2, 2018 in JP Application No. 2017243289.
Office Action dated Oct. 2, 2018 in JP Appiication No. 2017243290 (Partial English Translation).
Office Action dated Oct. 22, 2018 in U.S. Appl. No. 15/627,556, by Ogata.
Office Action dated Oct. 22, 2018 in U.S. Appl. No. 15/627,664, by Ogata.
Office Action dated Oct. 22, 2018 in U.S. Appl. No. 15/627,671, by Ogata.
Office Action dated Oct. 24, 2018 in U.S. Appl. No. 15/627,804, by Ogata.
Office Action dated Nov. 29, 2016 in JP Application No. 2016024163 (Partial English Translation).
Office Action dated Dec. 6, 2016 in JP Application No. 2016127005.
Office Action dated Dec. 20, 2018 in U.S. Appl. No. 15/627,585, by Ogata.
Office Action dated Dec. 21, 2016 in KR Application No. 1020160077240.
Office Action dated Dec. 31, 2018 in U.S. Appl. No. 15/627,736, by Ogata.
Solvay, "Solef PVDF, Design & Processing Guide," pp. 1-64 (2015).
Written Opinion dated Jan. 10, 2017 in International Application No. PCT/JP2016/081481.
Kawanishi, K., "Effect of Crystalline Forms of Polyvinylidene fluoride (PVDF) on PVDF Resin Coated Steel Sheet Bendability," The Journal of the Surface Finishing Society of Japan, vol. 48, No. 8, pp. 811-814 (1997).
Office Action dated Sep. 23, 2020 in JP Application No. 2016123055 (Partial English Translation).
Obata, J., "Scratch Tester" Technical Sheet No. 13011, Japan, Technology Research Institute of Osaka Prefecture, p. 1-2 (2013).
Office Action dated Aug. 18, 2020 in JP Application No. 2019108158 (with Partial English Translation).
English Translation of Office Action dated Dec. 22, 2020 in CN Application No. 201710472390.6.
Office Action dated Dec. 14, 2020 in U.S. Appl. No. 16/224,788, by Arise.
Office Action dated Dec. 21, 2020 in CN Application No. 201710472456.1.
Office Action dated Dec. 22, 2020 in CN Application No. 201710472390.6.
Office Action dated Jan. 21, 2021 in U.S. Appl. No. 16/224,777, by Kurakane.
Office Action dated Jan. 21, 2021 in U.S. Appl. No. 16/224,767, by Kurakane.
Office Action dated Feb. 2, 2021 in CN Application No. 201710467490.X.
Office Action dated Mar. 10, 2021 in CN Application No. 201710472303.7.
Office Action dated Jun. 23, 2021 in U.S. Appl. No. 16/224,767, by Kurakane.
Office Action dated Aug. 23, 2021 in CN Application No. 201710472303.7.

\* cited by examiner

NONAQUEOUS ELECTROLYTE SECONDARY BATTERY

This Nonprovisional application claims priority under U.S.C. § 119 on Patent Application No. 2017-243278 filed in Japan on Dec. 19, 2017, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium secondary batteries, have a high energy density and are thus in wide use as batteries for, for example, personal computers, mobile telephones, and portable information terminals. Such nonaqueous electrolyte secondary batteries have recently been developed as on-vehicle batteries. Patent Literature 1, for example, discloses a nonaqueous electrolyte secondary battery including a polyolefin porous film and a porous layer containing a polyvinylidene fluoride-based resin.

CITATION LIST

Patent Literature

[Patent Literature 1]
Japanese Patent No. 5432417 (Registration date: Dec. 13, 2013)

SUMMARY OF INVENTION

Technical Problem

The above conventional nonaqueous electrolyte secondary battery, which includes a polyolefin porous film and a porous layer containing a polyvinylidene fluoride-based resin, unfortunately has room for improvement in terms of charge capacity after cycles. In other words, there has been a demand for improvement in the charge recovery capacity property that the above nonaqueous electrolyte secondary battery has after cycles.

It is an object of an aspect of the present invention to provide a nonaqueous electrolyte secondary battery whose charge recovery capacity property after cycles is excellent.

Solution to Problem

A nonaqueous electrolyte secondary battery in accordance with a first aspect of the present invention includes: a nonaqueous electrolyte secondary battery separator including a polyolefin porous film; a porous layer containing a polyvinylidene fluoride-based resin; a positive electrode plate; and a negative electrode plate, the positive electrode plate having a value represented by Formula (1) below which value is not less than 0.00 and not more than 0.50, the negative electrode plate having a value represented by the Formula (1) below which value is not less than 0.00 and not more than 0.50, $$|1-T/M| \quad (1)$$

where T represents a critical load distance in a TD in a scratch test under a constant load of 0.1 N, and M represents a critical load distance in an MD in a scratch test under a constant load of 0.1 N, the porous layer being between (i) the nonaqueous electrolyte secondary battery separator and (ii) at least one of the positive electrode plate and the negative electrode plate, the polyvinylidene fluoride-based resin containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin both contained in the polyvinylidene fluoride-based resin, the amount of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

A nonaqueous electrolyte secondary battery in accordance with a second aspect of the present invention is configured as in the first aspect and is further configured such that the positive electrode plate contains a transition metal oxide.

A nonaqueous electrolyte secondary battery in accordance with a third aspect of the present invention is configured as in the first or second aspect and is further configured such that the negative electrode plate contains a graphite.

The nonaqueous electrolyte secondary battery in accordance with a fourth aspect of the present invention is configured as in any one of the first to third aspects and further includes: another porous layer which is provided between (i) the nonaqueous electrolyte secondary battery separator and (ii) at least one of the positive electrode plate and the negative electrode plate.

A nonaqueous electrolyte secondary battery in accordance with a fifth aspect of the present invention is configured as in the fourth aspect and is further configured such that the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin, and a water-soluble polymer.

A nonaqueous electrolyte secondary battery in accordance with a sixth aspect of the present invention is configured as in the fifth aspect and is further configured such that the polyamide-based resin is aramid resin.

Advantageous Effects of Invention

An aspect of the present invention provides a nonaqueous electrolyte secondary battery whose charge recovery capacity property after cycles is excellent.

DESCRIPTION OF EMBODIMENTS

Figure 1:
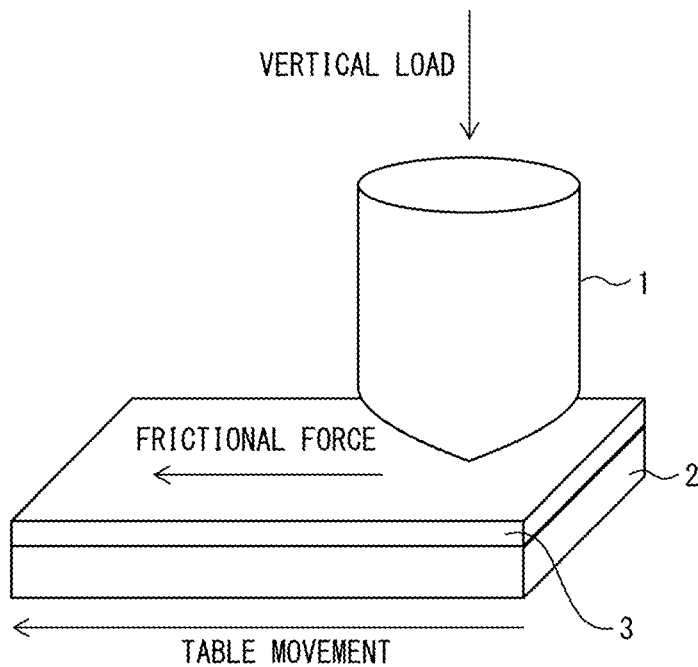
FIG. 1 is a diagram illustrating (i) a device used in a scratch test in accordance with an embodiment of the present invention and (ii) an operation of the device.

The following description will discuss an embodiment of the present invention in detail. Note that numerical expressions such as "A to B" herein mean "not less than A and not more than B".

Embodiment 1: Nonaqueous Electrolyte Secondary Battery

A nonaqueous electrolyte secondary battery in accordance with Embodiment 1 of the present invention includes: a nonaqueous electrolyte secondary battery separator including a polyolefin porous film; a porous layer containing a polyvinylidene fluoride-based resin; a positive electrode plate; and a negative electrode plate, the porous layer being between (i) the nonaqueous electrolyte secondary battery separator and (ii) at least one of the positive electrode plate and the negative electrode plate, the nonaqueous electrolyte secondary battery having features (i) and (ii) below.

(i) The positive electrode plate having a value represented by Formula (1) below which value is not less than 0.00 and not more than 0.50, the negative electrode plate having a value represented by the Formula (1) below which value is not less than 0.00 and not more than 0.50, $$|1-T/M| \qquad (1)$$

where T represents the critical load distance in the TD in a scratch test under a constant load of 0.1 N, and M represents the critical load distance in the MD in a scratch test under a constant load of 0.1 N.

(ii) The polyvinylidene fluoride-based resin containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin both contained in the polyvinylidene fluoride-based resin, the amount of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

Note that a nonaqueous electrolyte secondary battery in accordance with an embodiment of the present invention includes not only the above-described positive electrode plate, negative electrode plate, nonaqueous electrolyte secondary battery separator, and porous layer but also other component(s) such as a nonaqueous electrolyte.

<Nonaqueous Electrolyte Secondary Battery Separator>

An embodiment of the present invention includes a separator for a nonaqueous electrolyte secondary battery (hereinafter referred to as a "nonaqueous electrolyte secondary battery separator") which separator includes a polyolefin porous film. The description below may use the term "porous film" to refer to a polyolefin porous film.

The porous film itself can be the nonaqueous electrolyte secondary battery separator. The porous film itself can also be a base material of a nonaqueous electrolyte secondary battery laminated separator in which a porous layer (described later) is disposed on the porous film. The porous film contains polyolefin as a main component and has a large number of pores therein, which pores are connected to one another, so that a gas and a liquid can pass through the porous film from one surface of the porous film to the other.

The nonaqueous electrolyte secondary battery separator in accordance with an embodiment of the present invention may be provided with, disposed on at least one surface thereof, a porous layer (described later) containing a polyvinylidene fluoride-based resin. This laminated body, in which the porous layer is disposed on at least one surface of the nonaqueous electrolyte secondary battery separator, is referred to in the present specification as a "nonaqueous electrolyte secondary battery laminated separator". The description below may use the term "laminated separator" to refer to a nonaqueous electrolyte secondary battery laminated separator. Further, the nonaqueous electrolyte secondary battery separator in accordance with an embodiment of the present invention may include, in addition to a polyolefin porous film, another layer(s) such as an adhesive layer, a heat-resistant layer, and/or a protective layer.

The porous film contains a polyolefin at a proportion of not less than 50% by volume, preferably not less than 90% by volume, more preferably not less than 95% by volume, relative to the entire porous film. The polyolefin preferably contains a high molecular weight component having a weight-average molecular weight within a range of $5\times10^5$ to $15\times10^6$. In particular, the polyolefin more preferably contains a high molecular weight component having a weight-average molecular weight of not less than 1,000,000 because such a polyolefin allows the nonaqueous electrolyte secondary battery separator to have a higher strength.

Specific examples of the polyolefin, which is a thermoplastic resin, include a homopolymer or a copolymer each produced by (co)polymerizing a monomer such as ethylene, propylene, 1-butene, 4-methyl-1-pentene, or 1-hexene. Examples of the homopolymer include polyethylene, polypropylene, and polybutene. Examples of the copolymer include an ethylene-propylene copolymer.

Among the above examples, polyethylene is preferable as it is capable of preventing (shutting down) a flow of an excessively large electric current at a lower temperature. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a film thickness of preferably 4 μm to 40 μm, more preferably 5 μm to 30 μm, still more preferably 6 μm to 15 μm.

The porous film only needs to have a weight per unit area which weight is determined as appropriate in view of the strength, film thickness, weight, and handleability of the separator. Note, however, that the porous film has a weight per unit area of preferably 4 g/m² to 20 g/m², more preferably 4 g/m² to 12 g/m², still more preferably 5 g/m² to 10 g/m², so as to allow a nonaqueous electrolyte secondary battery that includes a nonaqueous electrolyte secondary battery laminated separator including the porous film to have a higher weight energy density and a higher volume energy density.

The porous film has an air permeability of preferably 30 sec/100 mL to 500 sec/100 mL, more preferably 50 sec/100 mL to 300 sec/100 mL, in terms of Gurley values. A porous film having an air permeability within the above range can have sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature. Further, in order to obtain sufficient ion permeability and prevent particles from entering the positive electrode and/or the negative electrode, the porous film has pores each having a pore size of preferably not larger than 0.3 μm, more preferably not larger than 0.14 μm.

The porous film has a white index (WI) (hereinafter also referred to simply as "white index (WI)" or "WI") of preferably not less than 85 and not more than 98, more preferably not less than 90, even more preferably not more than 97, the white index (WI) being defined in American Standard Test Methods (hereinafter abbreviated as "ASTM") E313.

WI is an indicator of a color tone (whiteness) of a sample, and is used to indicate, for example, (i) the fading characteristic of a dye or (ii) the degree of oxidation degradation in transparent or white resin being processed. A higher WI value means a higher degree of whiteness. A lower WI value means a lower degree of whiteness. Further, a lower WI value should indicate a larger amount of functional groups such as a carboxy group at the surface of the porous film which surface is in contact with air (oxygen) (for example, the surface of pores in the porous film). Such functional groups prevent permeation of Li ions and consequently lower the ion permeability. A porous film having a high WI value should mean that reflection and scattering caused therein have low wavelength dependency.

A porous film can be produced by, for example, (i) a method of adding a filler (pore forming agent) to a resin such as polyolefin, shaping the resin into a sheet, then removing the filler with use of an appropriate solvent, and stretching the sheet from which the filler has been removed, or (ii) a method of adding a filler to a resin such as polyolefin, shaping the resin into a sheet, then stretching the sheet, and removing the filler from the stretched sheet. This means that a porous film as a final product normally does not contain a filler.

The inventor of the present invention has discovered that a porous film can have a WI value of not less than 85 and not more than 98 in a case where (i) generation of a functional group such as a carboxyl group is prevented by using, during production of the porous film, a filler having a large BET specific surface area to allow for an increase in dispersibility of the filler and to consequently prevent local oxidation degradation resulting from defective dispersion of the filler during heat processing, and (ii) the porous film is made denser.

The "filler having a large BET specific surface area" refers to a filler having a BET specific surface area of not less than 6 $m^2/g$ and not more than 16 $m^2/g$. A filler having a BET specific surface area of less than 6 $m^2/g$ is not preferable. This is because such a filler tends to cause large-sized pores to be developed. A filler having a BET specific surface area of more than 16 $m^2/g$ will cause agglomeration of the filler and will consequently cause defective dispersion of the filler, so that dense pores are less likely to be developed. The filler has a BET specific surface area of preferably not less than 8 $m^2/g$ and not more than 15 $m^2/g$, more preferably not less than 10 $m^2/g$ and not more than 13 $m^2/g$.

Specific examples of the filler include fillers made of inorganic matters such as calcium carbonate, magnesium carbonate, barium carbonate, calcium sulfate, magnesium sulfate, and barium sulfate. The porous film can contain (i) only one kind of filler or (ii) two or more kinds of fillers in combination. Among the above examples, a filler made of calcium carbonate is particularly preferable from the viewpoint of its large BET specific surface area.

Whether a porous film has a WI value of not less than 85 and not more than 98 can be determined through, for example, measurements of the WI value with use of an integrating-sphere spectrocolorimeter. The above porous film has a front surface and a back surface both of which satisfy the requirement of a WI value of not less than 85 and not more than 98.

In a case where a porous film has a WI value of not less than 85 and not more than 98, the amount of functional groups such as a carboxy group at the surface of the porous film which surface is in contact with air (oxygen) is appropriate, making it possible to increase the ion permeability within an appropriate range.

If a porous film has a WI value of less than 85, the amount of the above functional groups will be large, reducing the ion permeability of the porous film.

If a porous film has a WI value of more than 98, the amount of functional groups at the surface of the porous film which surface is in contact with air (oxygen) will be too small, undesirably decreasing the affinity of the film with electrolyte.

In a case where a porous film is provided with a porous layer or another layer each disposed on the porous film, the physical property values of the porous film, which is included in a laminated body including the porous film and a porous layer or another layer, can be measured after the porous layer or other layer is removed from the laminated body. The porous layer or other layer can be removed from the laminated body by, for example, a method of dissolving the resin of the porous layer or other layer with use of a solvent such as N-methylpyrrolidone or acetone for removal.

<Porous Layer>

For an embodiment of the present invention, the porous layer is disposed, as a member of a nonaqueous electrolyte secondary battery, between (i) the nonaqueous electrolyte secondary battery separator and (ii) at least one of the positive electrode plate and the negative electrode plate. The porous layer may be present on one surface or both surfaces of the nonaqueous electrolyte secondary battery separator. The porous layer may alternatively be disposed on an active material layer of at least one of the positive electrode plate and the negative electrode plate. The porous layer may alternatively be provided between the nonaqueous electrolyte secondary battery separator and at least one of the positive electrode plate and the negative electrode plate in such a manner as to be in contact with the nonaqueous electrolyte secondary battery separator and the at least one of the positive electrode plate and the negative electrode plate. There may be a single porous layer or two or more porous layers between the nonaqueous electrolyte secondary battery separator and at least one of the positive electrode plate and the negative electrode plate.

It is preferable that a resin that may be contained in the porous layer be insoluble in the electrolyte of the battery and be electrochemically stable when the battery is in normal use. In a case where the porous layer is disposed on one surface of the porous film, the porous layer is preferably disposed on that surface of the porous film which surface faces the positive electrode plate of the nonaqueous electrolyte secondary battery, more preferably on that surface of the porous film which surface comes into contact with the positive electrode plate.

The porous layer is preferably an insulating porous layer containing a resin.

The porous layer in an embodiment of the present invention contains a PVDF-based resin, the PVDF-based resin containing an α-form PVDF-based resin in an amount of not less than 35.0 mol % with respect to 100 mol % of the combined amount of the α-form PVDF-based resin and a β-form PVDF-based resin both contained in the PVDF-based resin.

The content of an α-form PVDF-based resin is calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

The porous layer contains a large number of pores connected to one another, and thus allows a gas or a liquid to pass therethrough from one surface to the other. Further, in a case where the porous layer in accordance with an embodiment of the present invention is used as a constituent member of a nonaqueous electrolyte secondary battery laminated separator, the porous layer can be a layer capable of adhering to an electrode as the outermost layer of the separator.

Examples of the PVDF-based resin include homopolymers of vinylidene fluoride, copolymers of vinylidene fluoride and other monomer(s) copolymerizable with vinylidene fluoride, and mixtures of the above polymers. Examples of the monomer copolymerizable with vinylidene fluoride include hexafluoropropylene, tetrafluoroethylene, trifluoroethylene, trichloroethylene, and vinyl fluoride. The present embodiment can use (i) one kind of monomer or (ii) two or more kinds of monomers selected from the above. The PVDF-based resin can be synthesized through emulsion polymerization or suspension polymerization.

The PVDF-based resin contains vinylidene fluoride at a proportion of normally not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer.

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous film layer) included in a nonaqueous electrolyte secondary battery separator than a porous layer not containing one of the two kinds of PVDF-based resins, with the result of a higher peel strength between the two layers. The first resin and the second resin preferably have a mass ratio of 15:85 to 85:15.

The PVDF-based resin has a weight-average molecular weight of preferably 200,000 to 3,000,000, more preferably 200,000 to 2,000,000, even more preferably 500,000 to 1,500,000. A PVDF-based resin having a weight-average molecular weight of not less than 200,000 tends to allow a porous layer and an electrode to adhere to each other sufficiently. A PVDF-based resin having a weight-average molecular weight of not more than 3,000,000 tends to allow for excellent shaping easiness.

The porous layer in accordance with an embodiment of the present invention may contain a resin other than the PVDF-based resin. Examples of the other resin include a styrene-butadiene copolymer; homopolymers or copolymers of vinyl nitriles such as acrylonitrile and methacrylonitrile; and polyethers such as polyethylene oxide and polypropylene oxide.

The porous layer in accordance with an embodiment of the present invention may contain a filler. The filler may be an inorganic (such as fine metal oxide particles) or an organic filler. The filler is contained at a proportion of preferably not less than 1% by mass and not more than 99% by mass, more preferably not less than 10% by mass and not more than 98% by mass, relative to the combined amount of the PVDF-based resin and the filler. The proportion of the filler may have a lower limit of 50% by mass, 70% by mass, or 90% by mass. The organic or inorganic filler may be a conventionally publicly known filler.

The porous layer in accordance with an embodiment of the present invention has an average thickness of preferably 0.5 μm to 10 μm, more preferably 1 μm to 5 μm, per layer in order to ensure adhesion to an electrode and a high energy density.

A porous layer having a film thickness of not less than 0.5 μm per layer can (i) sufficiently reduce the possibility of internal short circuiting resulting from, for example, a breakage of the nonaqueous electrolyte secondary battery and (ii) retain a sufficient amount of electrolyte.

If the porous layer has a thickness of more than 10 μm per layer, the nonaqueous electrolyte secondary battery will have an increased resistance to permeation of lithium ions. Thus, repeating charge-and-discharge cycles will degrade the positive electrode of the nonaqueous electrolyte secondary battery, with the result of a degraded rate characteristic and a degraded cycle characteristic. Further, such a porous layer will increase the distance between the positive electrode and the negative electrode, with the result of a decrease in the internal capacity efficiency of the nonaqueous electrolyte secondary battery.

The porous layer in accordance with the present embodiment is preferably disposed between the nonaqueous electrolyte secondary battery separator and the positive electrode active material layer of the positive electrode plate. The descriptions below of the physical properties of the porous layer are at least descriptions of the physical properties of a porous layer disposed between the nonaqueous electrolyte secondary battery separator and the positive electrode active material layer of the positive electrode plate in a nonaqueous electrolyte secondary battery.

The porous layer only needs to have a weight per unit area (per layer) which weight is appropriately determined in view of the strength, film thickness, weight, and handleability of the porous layer. The material(s) of the porous layer is applied in an amount (weight per unit area) of preferably 0.5 g/m$^2$ to 20 g/m$^2$, more preferably 0.5 g/m$^2$ to 10 g/m$^2$, per layer.

A porous layer having a weight per unit area which weight falls within the above numerical range allows a nonaqueous electrolyte secondary battery including the porous layer to have a higher weight energy density and a higher volume energy density. If the weight per unit area of the porous layer is beyond the above range, the nonaqueous electrolyte secondary battery will be heavy.

The porous layer has a porosity of preferably 20% by volume to 90% by volume, more preferably 30% by volume to 80% by volume, in order to achieve sufficient ion permeability. The pore diameter of the pores in the porous layer is preferably not more than 1.0 μm, more preferably not more than 0.5 μm. In a case where the pores each have such a pore diameter, the porous layer can achieve sufficient ion permeability.

The porous layer in accordance with an embodiment of the present invention has a surface roughness, in terms of a ten-point average roughness (Rz), of preferably 0.8 μm to 8.0 μm, more preferably 0.9 μm to 6.0 μm, even more preferably 1.0 μm to 3.0 μm. The ten-point average roughness (Rz) is a value measured by a method in conformity with JISB 0601-1994 (or Rzjis of JIS B 0601-2001). Specifically, Rz is a value measured with use of ET4000 (available from Kosaka Laboratory Ltd.) with a measurement length of 1.25 mm, a measurement rate of 0.1 mm/sec, and a temperature and humidity of 25° C./50% RH.

The porous layer in accordance with an embodiment of the present invention has a coefficient of kinetic friction of preferably 0.1 to 0.6, more preferably 0.1 to 0.4, even more preferably 0.1 to 0.3. The coefficient of kinetic friction is a value measured by a method in conformity with JIS K 7125. Specifically, the coefficient of kinetic friction for the present invention is a value measured with use of Surface Property Tester (available from Heidon).

The nonaqueous electrolyte secondary battery laminated separator has an air permeability of preferably 30 sec/100 mL to 1000 sec/100 mL, more preferably 50 sec/100 mL to 800 sec/100 mL, in terms of Gurley values. The nonaqueous electrolyte secondary battery laminated separator, which has the above air permeability, allows the nonaqueous electrolyte secondary battery to have sufficient ion permeability.

An air permeability less than the above range means that the nonaqueous electrolyte secondary battery laminated separator has a high porosity and thus has a coarse laminated structure. This may result in a nonaqueous electrolyte secondary battery laminated separator having a lower strength and thus having an insufficient shape stability at high temperatures in particular. An air permeability larger than the above range may, on the other hand, prevent the nonaqueous electrolyte secondary battery laminated separator from having sufficient ion permeability and thus degrade the battery characteristics of the nonaqueous electrolyte secondary battery.

(Crystal Forms of PVDF-Based Resin)

The PVDF-based resin included in the porous layer in accordance with an embodiment of the present invention is such that, assuming that the sum of the respective amounts of an α-form PVDF-based resin and a β-form PVDF-based resin both contained in the PVDF-based resin is 100 mol %, the amount of an α-form PVDF-based resin contained in the PVDF-based resin is not less than not less than 35.0 mol %, preferably not less than 37.0 mol %, more preferably not less than 40.0 mol %, even more preferably not less than 44.0 mol %. Further, the amount of the α-form PVDF-based resin is preferably not more than 90.0 mol %.

A porous layer containing an α-form PVDF-based resin in an amount within the above range is suitably usable as a member of a nonaqueous electrolyte secondary battery whose charge recovery capacity property after cycles is excellent, in particular as a member of a laminated separator of a nonaqueous electrolyte secondary battery or as a member of an electrode of a nonaqueous electrolyte secondary battery.

For an embodiment of the present invention, the porous layer contains a PVDF-based resin containing an α-form PVDF-based resin at a proportion not less than a certain level as described above. This makes it possible to reduce, for example, deformation of the internal structure of the porous layer and blocking of pores both resulting from the PVDF-based resin being deformed due to high temperatures caused by repeated charge-and-discharge cycles. This in turn prevents the ion permeability of the porous layer from being decreased as a result of repeated charge and discharge cycles, and improves the charge recovery capacity property that the nonaqueous electrolyte secondary battery has after charge and discharge cycles.

The PVDF-based resin containing an α-form PVDF-based resin is arranged such that the polymer of the PVDF-based resin contains a PVDF skeleton having molecular chains including a main-chain carbon atom bonded to a fluorine atom (or a hydrogen atom) adjacent to two carbon atoms one of which is bonded to a hydrogen atom (or a fluorine atom) having a trans position and the other (opposite) one of which is bonded to a hydrogen atom (or a fluorine atom) having a gauche position (positioned at an angle of 601, wherein two or more such conformations are chained consecutively as follows:

$$(\mathrm{TG}\overline{\mathrm{T}\mathrm{G}}\text{ structure}) \qquad [\text{Math. 1}]$$

and the molecular chains each have the following type:

$$\mathrm{TG}\mathrm{T}\overline{\mathrm{G}} \qquad [\text{Math. 2}]$$

wherein the respective dipole moments of C—$F_2$ and C—$H_2$ bonds each have a component perpendicular to the molecular chain and a component parallel to the molecular chain.

A PVDF-based resin containing an α-form PVDF-based resin has characteristic peaks at around −95 ppm and at around −78 ppm in a $^{19}$F-NMR spectrum.

The PVDF-based resin containing a β-form PVDF-based resin is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180 to the direction of the carbon-carbon bond.

The PVDF-based resin containing a β-form PVDF-based resin may be arranged such that the polymer of the PVDF-based resin contains a PVDF skeleton that has a TT-type conformation in its entirety. The PVDF-based resin containing a β-form PVDF-based resin may alternatively be arranged such that a portion of the PVDF skeleton has a TT-type conformation and that the PVDF-based resin containing a β-form PVDF-based resin has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of C—$F_2$ and C—$H_2$ bonds each have a component perpendicular to the molecular chain.

A PVDF-based resin containing a β-form PVDF-based resin has characteristic peaks at around −95 ppm in a $^{19}$F-NMR spectrum.

(Method for Calculating Content Rates of α-Form PVDF-Based Resin and β-Form PVDF-Based Resin in PVDF-Based Resin)

The rate of content of an α-form PVDF-based resin and the rate of content of a β-form PVDF-based resin in the porous layer in accordance with an embodiment of the present invention relative to 100 mol % of the combined content of the α-form PVDF-based resin and the β-form PVDF-based resin may be calculated from a $^{19}$F-NMR spectrum obtained from the porous layer. The content rates are specifically calculated as follows, for example:

(1) An $^{19}$F-NMR spectrum is obtained from a porous layer containing a PVDF-based resin, under the following conditions.

Measurement Conditions

Measurement device: AVANCE400 available from Bruker Biospin

Measurement method: single-pulse method

Observed nucleus: $^{19}$F

Spectral bandwidth: 100 kHz

Pulse width: 3.0 s (90° pulse)

Pulse repetition time: 5.0 s

Reference material: $C_6F_6$ (external reference: −163.0 ppm)

Temperature: 22° C.

Sample rotation frequency: 25 kHz (2) An integral value of a peak at around −78 ppm in the $^{19}$F-NMR spectrum obtained in (1) is calculated and is regarded as an α/2 amount.

(3) As with the case of (2), an integral value of a peak at around −95 ppm in the $^{19}$F-NMR spectrum obtained in (1) is calculated and is regarded as an {(α/2)+β} amount.

(4) Assuming that the sum of (i) the content of an α-form PVDF-based resin and (ii) the content of a β-form PVDF-based resin is 100 mol %, the rate of content of the α-form PVDF-based resin (hereinafter referred to also as "α rate") is calculated from the integral values of (2) and (3) in accordance with the following Expression (2):

$$\alpha \text{ rate (mol \%)} = [(\text{integral value at around } -78 \text{ ppm}) \times 2 / \{(\text{integral value at around } -95 \text{ ppm}) + (\text{integral value at around } -78 \text{ ppm})\}] \times 100 \quad (2)$$

(5) Assuming that the sum of (i) the content of an α-form PVDF-based resin and (ii) the content of a β-form PVDF-based resin is 100 mol %, the rate of content of the β-form PVDF-based resin (hereinafter referred to also as "β rate") is calculated from the value of the α rate of (4) in accordance with the following Expression (3):

$$\beta \text{ rate (mol \%)} = 100 \text{ (mol \%)} - \alpha \text{ rate (mol \%)} \quad (3)$$

(Method for Producing Porous Layer and Nonaqueous Electrolyte Secondary Battery Laminated Separator)

A porous layer and nonaqueous electrolyte secondary battery laminated separator each in accordance with an embodiment of the present invention may each be produced by any of various production methods.

In an example method, a porous layer containing a PVDF-based resin and optionally a filler is formed through one of the processes (1) to (3) below on a surface of a porous film intended to be a base material. In the case of the process (2) or (3), a porous layer deposited is dried for removal of the solvent. In the processes (1) to (3), the coating solution, in the case of production of a porous layer containing a filler, preferably contains a filler dispersed therein and a PVDF-based resin dissolved therein.

The coating solution for use in a method for producing a porous layer in accordance with an embodiment of the present invention can be prepared typically by (i) dissolving, in a solvent, a resin to be contained in the porous layer and (ii) in a case where a filler is to be contained in the porous layer, dispersing the filler in the solvent.

(1) A process of (i) coating a surface of a porous film with a coating solution containing fine particles of a PVDF-based resin to be contained in a porous layer and optionally fine particles of a filler and (ii) drying the surface of the porous film to remove the solvent (dispersion medium) from the coating solution for formation of a porous layer.

(2) A process of (i) coating a surface of a porous film with the coating solution described in (1) and then (ii) immersing the porous film into a deposition solvent (which is a poor solvent for the PVDF-based resin) for deposition of a porous layer.

(3) A process of (i) coating a surface of a porous film with the coating solution described in (1) and then (ii) making the coating solution acidic with use of a low-boiling-point organic acid for deposition of a porous layer.

Examples of the solvent (dispersion medium) in the coating solution include N-methylpyrrolidone, N,N-dimethylacetamide, N,N-dimethylformamide, acetone, and water.

The deposition solvent is preferably isopropyl alcohol or t-butyl alcohol, for example.

For the process (3), the low-boiling-point organic acid can be, for example, paratoluene sulfonic acid or acetic acid.

The coating solution may contain an additive(s) as appropriate such as a dispersing agent, a plasticizing agent, a surface active agent, and a pH adjusting agent as a component(s) other than the resin and the filler.

The base material can be, other than a porous film, another film, a positive electrode plate, a negative electrode plate, or the like.

The coating solution can be applied to the base material by a conventionally publicly known method. Specific examples of such a method include a gravure coater method, a dip coater method, a bar coater method, and a die coater method.

(Method for Controlling Crystal Forms of PVDF-Based Resin)

The crystal form of the PVDF-based resin contained in the porous layer in accordance with an embodiment of the present invention can be controlled on the basis of (i) drying conditions such as the drying temperature, and the air velocity and air direction during drying and (ii) the deposition temperature at which a porous layer containing a PVDF-based resin is deposited with use of a deposition solvent or a low-boiling-point organic acid.

In a case where the coating solution is simply dried as in the process (1), the drying conditions may be changed as appropriate by adjusting, for example, the amount of the solvent in the coating solution, the concentration of the PVDF-based resin in the coating solution, the amount of the filler (if contained), and/or the amount of the coating solution to be applied. In a case where a porous layer is to be formed through the above process (1), it is preferable that the drying temperature be 30° C. to 100° C., that the direction of hot air for drying be perpendicular to a nonaqueous electrolyte secondary battery separator or electrode plate to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a nonaqueous electrolyte secondary battery separator or electrode plate to which the coating solution has been applied, and that the velocity of the hot air is 0.4 m/s to 40 m/s.

In a case where a porous layer is to be formed through the above process (2), it is preferable that the deposition temperature be −25° C. to 60° C. and that the drying temperature be 20° C. to 100° C. Specifically, in a case where a porous layer is to be formed through the above process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

(Another Porous Layer)

The nonaqueous electrolyte secondary battery in accordance with an embodiment of the present invention can contain another porous layer in addition to (i) the porous film and (ii) the porous layer containing the PVDF-based resin. The another porous layer need only be provided between (i) the nonaqueous electrolyte secondary battery separator and (ii) at least one of the positive electrode plate and the negative electrode plate. The porous layer and the another porous layer may be provided in any order with respect to the nonaqueous electrolyte secondary battery separator. In a preferable configuration, the porous film, the another porous layer, and the porous layer containing the PVDF-based resin are disposed in this order. In other words, the another porous layer is provided between the porous film and the porous layer containing the PVDF-based resin. In another preferable configuration, the another porous layer and the porous layer containing the PVDF-based resin are provided in this order on both surfaces of the porous film.

Examples of a resin which can be contained in the another porous layer in accordance with an embodiment of the present invention encompass: polyolefins; (meth)acrylate-based resins; fluorine-containing resins (excluding polyvinylidene fluoride-based resins); polyamide-based resins; polyimide-based resins; polyester-based resins; rubbers; resins with a melting point or glass transition temperature of not lower than 180° C.; water-soluble polymers; polycarbonate, polyacetal, and polyether ether ketone.

Among the above resins, polyolefins, (meth)acrylate-based resins, polyamide-based resins, polyester-based resins, and water-soluble polymers are preferable.

Preferable examples of the polyolefin encompass polyethylene, polypropylene, polybutene, and an ethylene-propylene copolymer.

Examples of the fluorine-containing resins include polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins include fluorine-containing rubber having a glass transition temperature of not higher than 23° C.

Preferable examples of the polyamide-based resin encompass aramid resins such as aromatic polyamide and wholly aromatic polyamide.

Specific examples of the aramid resin encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aramid resins, poly(paraphenylene terephthalamide) is more preferable.

Preferable examples of the polyester-based resin encompass (i) aromatic polyesters such as polyarylate and (ii) liquid crystal polyesters.

Examples of the rubbers encompass a styrene-butadiene copolymer and a hydride thereof, a methacrylic acid ester copolymer, an acrylonitrile-acrylic acid ester copolymer, a styrene-acrylic acid ester copolymer, an ethylene propylene rubber, and polyvinyl acetate.

Examples of the resin with a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymer encompass polyvinyl alcohol, polyethylene glycol, cellulose ether, sodium alginate, polyacrylic acid, polyacrylamide, and polymethacrylic acid.

Only one kind of these resins to be contained in the another porous layer can be used, or two or more kinds of these resins can be used in combination.

The other characteristics (e.g., thickness) of the another porous layer are similar to those (of the porous layer) described above, except that the porous layer contains the PVDF-based resin.

<Positive Electrode Plate>

A positive electrode plate in accordance with an embodiment of the present invention may be any positive electrode plate of which the value represented by Formula (1) below is not less than 0.00 and not more than 0.50. The positive electrode plate is, for example, a sheet-shaped positive electrode plate including (i) as a positive electrode active material layer, a positive electrode mix containing a positive electrode active material, an electrically conductive agent, and a binding agent and (ii) a positive electrode current collector supporting the positive electrode mix thereon. Note that the positive electrode plate may be such that the positive electrode current collector supports the positive electrode mix on both surfaces thereof or one of the surfaces thereof.

$$|1-T/M| \tag{1}$$

where T represents the critical load distance in the TD in a scratch test under a constant load of 0.1 N, and M represents the critical load distance in the MD in a scratch test under a constant load of 0.1 N.

The positive electrode active material is, for example, a material capable of being doped with and dedoped of lithium ions. Such a material is preferably a transition metal oxide. Specific examples of the transition metal oxide include a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. The positive electrode plate can contain (i) only one kind of electrically conductive agent or (ii) two or more kinds of electrically conductive agents in combination.

Examples of the binding agent includes thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene, as well as acrylic resin and styrene-butadiene-rubber. The binding agent functions also as a thickening agent.

Examples of the positive electrode current collector include electric conductors such as Al, Ni, and stainless steel. Among these, Al is preferable as it is easy to process into a thin film and less expensive.

Examples of a method for producing a sheet-shaped positive electrode plate include: a method in which a positive electrode active material, an electrically conductive agent, and a binding agent are pressure-molded on a positive electrode current collector; and a method in which (i) a positive electrode active agent, an electrically conductive agent, and a binding agent are formed into a paste as a positive electrode mix with the use of a suitable organic solvent, (ii) a positive electrode current collector is coated with the paste, and then (iii) the paste is dried and then pressured so that the paste is firmly fixed to the positive electrode current collector.

<Negative Electrode Plate>

A negative electrode plate in accordance with an embodiment of the present invention may be any negative electrode plate of which the value represented by Formula (1) below is not less than 0.00 and not more than 0.50. The negative electrode plate is, for example, a sheet-shaped negative electrode plate including (i) as a negative electrode active material layer, a negative electrode mix containing a negative electrode active material and (ii) a negative electrode current collector supporting the negative electrode mix thereon. Note that the negative electrode plate may be such that the negative electrode current collector supports the negative electrode mix on both surfaces thereof or one of the surfaces thereof.

$$|1-T/M| \quad (1)$$

where T represents the critical load distance in the TD in a scratch test under a constant load of 0.1 N, and M represents the critical load distance in the MD in a scratch test under a constant load of 0.1 N.

The sheet-shaped negative electrode plate preferably contains the above electrically conductive agent and binding agent.

Examples of the negative electrode active material include (i) a material capable of being doped with and dedoped of lithium ions, (ii) lithium metal, and (iii) lithium alloy. Examples of the material include carbonaceous materials. Examples of the carbonaceous materials include graphite such as natural graphite and artificial graphite.

Examples of the negative electrode current collector include Cu, Ni, and stainless steel. Among these, Cu is preferable as it is not easily alloyed with lithium in the case of a lithium-ion secondary battery in particular and is easily processed into a thin film.

Examples of a method for producing a sheet-shaped negative electrode plate include: a method in which a negative electrode active material is pressure-molded on a negative electrode current collector; and a method in which (i) a negative electrode active agent is formed into a paste with the use of a suitable organic solvent, (ii) a negative electrode current collector is coated with the paste, and then (iii) the paste is dried and then pressured so that the paste is firmly fixed to the negative electrode current collector. The above paste preferably includes the above electrically conductive agent and binding agent.

(Scratch Test)

As illustrated in FIG. 1, "scratch test" in accordance with an embodiment of the present invention is a test for measuring stress that occurs in a distance by which a measurement target object such as a porous film, a positive electrode plate, and a negative electrode plate is moved in a horizontal direction while a surface layer of the measurement target object is subjected to compressive deformation in a thickness direction by applying a certain load to an indenter (i.e. while the indenter is pressed down). Specifically, the scratch test is carried out by the following steps:

(1) A measurement target object 3 (a positive electrode plate or a negative electrode plate) is cut into a piece of 20 mm×60 mm. Then, a diluted glue solution which has been obtained by diluting Arabic Yamato aqueous liquid glue (available from YAMATO Co., Ltd.) with water by a 5-fold dilution factor is applied to an entire surface of a glass preparation (substrate 2) of 30 mm×70 mm so that the weight per unit area of the diluted glue solution is approximately 1.5 g/m$^2$. The cut piece of the measurement target object 3 and the substrate 2 are bonded together via the diluted glue solution having been applied to the substrate 2. Thereafter, a resulting laminated material is dried at a temperature of 25° C. for one whole day and night, so that a test sample is prepared. Note that the cut piece of the measurement target object 3 and the glass preparation (substrate 2) are to be bonded together with care so that no air bubble is made between the cut piece of the measurement target object 3 and the glass preparation. Note that in a case where the measurement target object 3 is an electrode plate (a positive electrode plate or a negative electrode plate), a resulting test sample is prepared in such a manner that an active material layer (a positive electrode active material layer or a negative electrode active material layer) of the electrode plate serves as an upper surface of the test sample which upper surface is to come into contact with a diamond indenter 1 (described later).

(2) The test sample prepared in the step (1) is placed on a microscratch testing device (available from CSEM Instruments). Then, while the diamond indenter 1 (in a conical shape having an apex angle of 120° and having a tip whose radius is 0.2 mm) of the testing device is applying a vertical load of 0.1 N to the test sample, a table of the testing device is moved by a distance of 10 mm in a transverse direction (TD) of the measurement target object at a speed of 5 mm/min. During the movement of the table, stress (force of friction) that occurs between the diamond indenter 1 and the test sample is measured.

Figure 2:
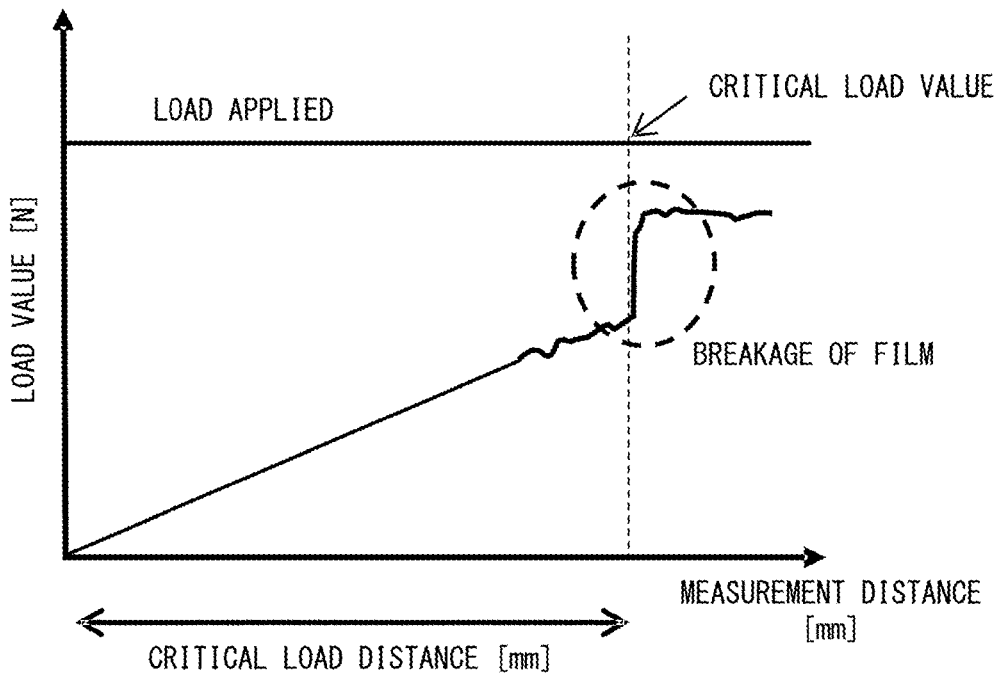
FIG. 2 is a graph which is plotted based on results of a scratch test in accordance with an embodiment of the present invention to show (i) a critical load value and (ii) a distance by which a porous film moves from a starting point of measurement to a point where a critical load is obtained.

(3) A line graph, which shows a relationship between a displacement of the stress measured in the step (2) and the distance of the movement of the table, is made. Then, based on the line graph, the following are calculated as illustrated in FIG. 2: (i) a critical load value in the transverse direction (TD) and (ii) a distance (critical load distance) in the TD between a starting point of measurement and a point where the critical load is obtained.

(4) The direction of the movement of the table is changed to a machine direction (MD), and the above steps (1) through (3) are repeated. Then, the following are calculated: (i) a critical load value in the MD and (ii) the distance (critical load distance) in the MD between a starting point of measurement and a point where the critical load is obtained.

Note that any conditions and the like for the measurement in the scratch test other than the conditions described above are similar to those disclosed in JIS R 3255.

The "MD" as used herein refers to a lengthwise direction of a positive electrode plate and a negative electrode plate, and the "TD" as used herein refers to a direction orthogonal to the MD. Note, however, that in a case where a positive electrode plate or a negative electrode plate is shaped in a square, the MD is a direction which is parallel to any of edges of the square, and the TD is a direction orthogonal to the MD.

The scratch test conducted on an electrode plate (a positive electrode plate or a negative electrode plate) as a measurement target object (i) models stress transfer inside an electrode active material layer (electrode active material particles (positive electrode active material particles or negative electrode active material particles)) due to expansion and shrinkage of the electrode active material layer along with charge/discharge of a nonaqueous electrolyte secondary battery into which the electrode plate is incorporated, and (ii) measures and calculates uniformity of the stress transfer.

Further, in the scratch test conducted on an electrode plate as a measurement target object, a measured critical load distance is affected by uniformity of a surface layer (electrode active material layer) of the electrode plate, the degree of alignment of particles present on a surface of the electrode active material layer of the electrode plate, the shape of the particles (e.g., aspect ratio of the particles), and the particle diameter of the particles.

Here, a positive electrode plate in accordance with an embodiment of the present invention has a value represented by the following Formula (1), which value is in a range of not less than 0.00 and not more than 0.50, preferably not less than 0.00 to not more than 0.47, more preferably not less than 0.00 to not more than 0.45.

Further, a negative electrode plate in accordance with an embodiment of the present invention has a value represented by the following Formula (1), which value is in a range of not less than 0.00 to not more than 0.50, preferably not less than 0.00 to not more than 0.49, more preferably not less than 0.00 to not more than 0.45:

$$|1-T/M| \tag{1}$$

where T represents the critical load distance in the TD in a scratch test under a constant load of 0.1 N, and M represents the critical load distance in the MD in a scratch test under a constant load of 0.1 N.

The values represented by the Formula (1) are each a value representing anisotropy of a critical load distance in a scratch test on each electrode plate. A value that is close to zero indicates that the critical load distance is more isotropic.

Hence, an electrode plate, which has a value beyond 0.50 as represented by the Formula (1), shows that there exists large anisotropy between a critical load distance in a TD and a critical load distance in an MD. In a nonaqueous electrolyte secondary battery including an electrode plate having the large anisotropy, stress is transferred nonuniformly inside an electrode active material layer due to expansion and shrinkage of electrode active material particles along with charge/discharge of the nonaqueous electrolyte secondary battery. This causes voids inside the electrode active material layer to have nonuniform diameters and to be distributed nonuniformly, and also causes stress inside the electrode active material layer to occur in a localized direction. This results in, during a charge-discharge cycle, disconnection of an electrically conductive path inside the electrode active material layer, separation of an electrode active material and an electrically conductive agent from a binding agent (binder), and decrease in adhesiveness between a current collector and the electrode active material layer. This may deteriorate battery characteristics such as a charge recovery capacity of the nonaqueous electrolyte secondary battery after a discharge cycle.

Examples of a method by which a value represented by Formula (1) is adjusted for an electrode plate (a positive electrode plate and a negative electrode plate) encompass: a method of adjusting a particle diameter of electrode active material particles, which serves as a material for an electrode plate, and/or an aspect ratio of the electrode active material particles; a method of applying a coating of an electrode mix (a positive electrode mix or a negative electrode mix) onto a current collector at a specific coating shear rate during formation of an electrode plate, to adjust an alignment property of electrode active material particles and/or a porosity of a resulting electrode active material layer; and a method of adjusting a compounding ratio at which an electrode active material, an electrically conductive agent, and a binding agent, which are materials for an electrode plate, are mixed to control a composition ratio of a resulting electrode plate (electrode active material layer).

Preferable among the above methods are, specifically, controlling the particle diameter of the electrode active material particles to fall within a range of 1 μm to 30 μm, controlling the aspect ratio (long diameter-to-short diameter ratio) of the electrode active material particles to fall within a range of 1 to 5, controlling a coating line speed (that is, a speed at which an active material is applied to a current collector; hereinafter referred to as "coating speed") to fall within a range of 10 m/sec to 200 m/sec, controlling the porosity of the electrode plate (porosity of the electrode active material layer) to fall within a range of 10% to 50%, and controlling a proportion of an active material component present in a composition of an electrode plate to fall within a range of equal to or greater than 80% by weight. By controlling the respective production conditions and the like described above to fall within suitable ranges, it is possible to suitably control a value represented by Formula (1) for an electrode plate to fall within a range of not less than 0.00 to not more than 0.50.

The porosity (ε) of an electrode active material layer can be calculated, by the formula below, from a density ρ (g/m³) of an electrode active material layer, respective mass compositions (wt %) $b^1$, $b^2$, ... $b^n$ of materials that constitute the electrode active material layer (e.g., a positive electrode active material, an electrically conductive agent, a binding agent, and others), and respective real densities (g/m³) $c^1$, $c^2$, ... $c^n$ of these materials. Note here that the real densities of the materials may be literature data or may be measured values obtained by a pycnometer method.

$$\varepsilon=1-\{\rho\times(b^1/100)/c^1+\rho\times(b^2/100)/c^2+\ldots\rho\times(b^n/100)/c^n\}\times100$$

<Nonaqueous Electrolyte>

A nonaqueous electrolyte in accordance with an embodiment of the present invention is a nonaqueous electrolyte generally used in a nonaqueous electrolyte secondary battery, and is not limited to any particular one. Examples of the nonaqueous electrolyte include a nonaqueous electrolyte prepared by dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The nonaqueous electrolyte can contain (i) only one kind of lithium salt or (ii) two or more kinds of lithium salts in combination.

Examples of the organic solvent to be contained in the nonaqueous electrolyte in accordance with an embodiment of the present invention include carbonates, ethers, nitriles, carbamates, sulfur-containing compounds, and fluorine-containing organic solvents obtained by introducing a fluorine group into any of the above organic solvents. The nonaqueous electrolyte can contain (i) only one kind of organic solvent or (ii) two or more kinds of organic solvents in combination.

<Method for Producing Nonaqueous Electrolyte Secondary Battery>

A nonaqueous electrolyte secondary battery in accordance with an embodiment of the present invention can be produced by, for example, (i) forming a nonaqueous electrolyte secondary battery member in which the positive electrode plate, a nonaqueous electrolyte secondary battery laminated separator including the aforementioned porous film, and the negative electrode plate are arranged in this order, (ii) inserting the nonaqueous electrolyte secondary battery member into a container for use as a housing of the nonaqueous electrolyte secondary battery, (iii) filling the container with a nonaqueous electrolyte, and (iv) hermetically sealing the container under reduced pressure. A nonaqueous electrolyte secondary battery in accordance with an embodiment of the present invention may have any shape such as the shape of a thin plate (sheet), a disk, a cylinder, or a prism such as a cuboid. The method of producing the nonaqueous electrolyte secondary battery in accordance with an embodiment of the present invention is not limited to any particular one, and can be any conventionally publicly known method.

The nonaqueous electrolyte secondary battery in accordance with an embodiment of the present invention includes, as described above, (i) a nonaqueous electrolyte secondary battery separator including a polyolefin porous film, (ii) a porous layer, (iii) a positive electrode plate, and (iv) a negative electrode plate. The nonaqueous electrolyte secondary battery in accordance with an embodiment of the present invention meets the requirements (i) to (iii) below.

(i) The polyvinylidene fluoride-based resin contained in the porous layer contains an α-form polyvinylidene fluoride-based resin in an amount of not less than 35.0 mol % with respect to 100 mol % of the combined amount of the α-form polyvinylidene fluoride-based resin and a β-form polyvinylidene fluoride-based resin both contained in the polyvinylidene fluoride-based resin.

(ii) The positive electrode plate has a value represented by Formula (1) below which value is not less than 0.00 and not more than 0.50.

(iii) The negative electrode plate has a value represented by Formula (1) below which value is not less than 0.00 and not more than 0.50.

$$|1-T/M| \quad (1)$$

where T represents the critical load distance in the TD in a scratch test under a constant load of 0.1 N, and M represents the critical load distance in the MD in a scratch test under a constant load of 0.1 N.

The nonaqueous electrolyte secondary battery in accordance with an embodiment of the present invention preferably further meets the requirement (iv) below in addition to the requirements (i) to (iii).

(iv) The polyolefin porous film has a white index (WI) of not less than 85 and not more than 98, the white index (WI) being defined in American Standards Test Methods E313.

As a result of the requirement (i) being met, the nonaqueous electrolyte secondary battery in accordance with an embodiment of the present invention is such that the porous layer has a stable structure even after charge and discharge cycles. As a result of the requirement (iv) being met, the polyolefin porous film (separator) has an increased cation permeability. As a result of the requirements (ii) and (iii) being met, expansion and shrinkage of electrode active material particles causes stress inside the electrode active material layer to be transferred uniformly during the charge and discharge process of the battery, with the result of the electrode active material layer isotropically following the expansion and shrinkage of the electrode active material particles. This makes it possible to easily maintain (i) the adhesiveness between the electrode active material particles and the electrically conductive agent (including the binder) both inside the electrode active material layer and (ii) the adhesiveness between the electrode active material layer and a current collecting foil.

A nonaqueous electrolyte secondary battery that meets the requirements (i) to (iii) is thus configured such that (a) the porous layer has a stable structure even after charge and discharge cycles and that (b) the adhesiveness between the electrode active material particles and the electrically conductive agent (including the binder) both inside the electrode active material layer and the adhesiveness between the electrode active material layer and the current collecting foil are maintained suitably, with the result of reduction in degradation of the battery during charge and discharge cycles. The nonaqueous electrolyte secondary battery in accordance with an embodiment of the present invention, as a result, enjoys improvement in the charge capacity property that the battery has after cycles; for instance, the nonaqueous electrolyte secondary battery in accordance with an embodiment of the present invention has a charge recovery capacity that is not degraded even after 100 cycles. More specifically, the nonaqueous electrolyte secondary battery in accordance with an embodiment of the present invention has a charge recovery capacity of not less than 125 mAh/g even after 100 cycles.

Further, as a result of the requirement (iv) being met, the nonaqueous electrolyte secondary battery not only has the benefits (a) and (b), but also is configured such that the polyolefin porous film has an increased cation permeability. This allows the nonaqueous electrolyte secondary battery to have a charge recovery capacity after cycles which charge recovery capacity is even better.

The present invention is not limited to the embodiment, but can be altered by a skilled person in the art within the scope of the claims. The present invention also encompasses in its technical scope any embodiment based on an appropriate combination of the technical means disclosed.

EXAMPLES

The following description will discuss embodiments of the present invention in greater detail with reference to Examples and Comparative Examples. Note, however, that the present invention is not limited to the following Examples.

[Measurement Methods]

In the Examples and Comparative Examples, measurements were made by the methods below.

(1) Film Thickness (Unit: μm)

The film thickness of a porous film was measured with use of a high-accuracy digital length measuring machine (VL-50) available from Mitutoyo Corporation.

(2) White Index (WI)

The WI value of a porous film was measured by Specular Component Included (SCI) method (including specular reflection) with use of a spectrocolorimeter (CM-2002, available from MINOLTA) on black paper (available from Hokuetsu Kishu Paper Co., Ltd., colored high-quality paper, black, thickest type, shirokuhan (788 mm×1091 mm with the long side extending in an MD)).

(3) Method for Calculating a Rate

A piece with a size of approximately 2 cm×5 cm was cut out from each of the laminated separators produced in the Examples and Comparative Examples below. Then, the rate of content (α rate) of the α-form PVDF-based resin in the PVDF-based resin contained in the cutout was measured through the above steps (1) to (4) (that is, through the steps (1) to (4) described under "Method for calculating content rates of α-form PVDF-based resin and β-form PVDF-based resin in PVDF-based resin" above).

(5) Measurement of Porosity of Positive Electrode Active Material Layer

The porosity of the positive electrode active material layer included in a positive electrode plate in Example 1 below was measured by the method below. The porosity of the positive electrode active material layer included in a positive electrode plate in any other Example below was measured by a similar method.

A positive electrode plate prepared by applying a layer of a positive electrode mix (a mixture of $LiNi_{0.5}Mn_{0.3}Co_{0.2}O_2$, an electrically conductive agent, and PVDF (at a weight ratio of 92:5:3)) on one surface of a positive electrode current collector (aluminum foil) was cut into a piece having a size of 14.5 cm² (4.5 cm×3 cm+1 cm×1 cm). The cut piece of the positive electrode plate had a mass of 0.215 g and had a thickness of 58 µm. The positive electrode current collector was cut into a piece having the same size as the cut piece of the positive electrode plate. The cut piece of the positive electrode current collector had a mass of 0.078 g and had a thickness of 20 µm.

The density ρ of the positive electrode active material layer was calculated as (0.215−0.078)/{(58−20)/10000× 14.5}=2.5 g/cm³.

Each of the materials contained in the positive electrode mix had a real density as follows: $LiNi_{0.5}Mn_{0.3}CO_{0.2}O_2$, an electrically conductive agent, and PVDF had real densities of 4.68 g/cm³, 1.8 g/cm³, and 1.8 g/cm³, respectively.

The positive electrode active material layer had a porosity ε of 40%, which was determined by calculation from the above values by the following formula:

$$\varepsilon = [1-\{2.5\times(92/100)/4.68+2.5\times(5/100)/1.8+2.5\times(3/100)/1.8\}]*100=40\%$$ (Formula)

(6) Measurement of Porosity of Negative Electrode Active Material Layer

The porosity of the negative electrode active material layer included in a negative electrode plate in Example 1 below was measured by the method below. The porosity of the negative electrode active material layer included in a negative electrode plate in any other Example below was measured by a similar method.

A negative electrode plate prepared by applying a layer of a negative electrode mix (a mixture of graphite, styrene-1, 3-butadiene copolymer, and sodium carboxymethyl cellulose (at a weight ratio of 98:1:1)) on one surface of a negative electrode current collector (copper foil) was cut into a piece having a size of 18.5 cm² (5 cm×3.5 cm+1 cm×1 cm). The cut piece of the negative electrode plate had a mass of 0.266 g and had a thickness of 48 µm. The negative electrode current collector was cut into a piece having the same size as the cut piece of the negative electrode plate. The cut piece of the negative electrode current collector had a mass of 0.162 g and had a thickness of 10 µm.

The density ρ of the negative electrode active material layer was calculated as (0.266−0.162)/{(48−10)/10000× 18.5}=1.49 g/cm³.

Each of the materials contained in the negative electrode mix had a real density as follows: graphite, styrene-1,3-butadiene copolymer, and sodium carboxymethyl cellulose had real densities of 2.2 g/cm³, 1 g/cm³, and 1.6 g/cm³, respectively.

The negative electrode active material layer had a porosity ε of 31%, which was determined by calculation from the above values by the following formula:

$$\varepsilon = [1-\{1.49\times(98/100)/2.2+1.49\times(1/100)/1+1.49\times(1/100)/1.6\}]*100=31\%$$ (Formula)

(7) Scratch Test

The critical load value and the ratio of a critical load distance in a TD to a critical load distance in a MD (T/M) of the positive electrode plate and the negative electrode plate of each of the Examples and Comparative Examples were measured by a scratch test through the steps (1) to (4) described under "Scratch test" above (see FIG. 1). Any conditions and the like for the measurement other than the conditions described for the above steps (1) to (4) were similar to those disclosed in JIS R 3255. The test involved use of a microscratch testing device (available from CSEM Instruments) as a measurement device.

(8) Charge Recovery Capacity after 100 Cycles

1. Initial Charge and Discharge

Nonaqueous electrolyte secondary batteries each of which included a nonaqueous electrolyte secondary battery laminated separator produced in one of the Examples and Comparative Examples and each of which had not been subjected to any charge-discharge cycle were each subjected to four cycles of initial charge and discharge at 25° C. Each of the four cycles of initial charge and discharge was carried out (i) at a voltage ranging from 2.7 V to 4.1 V, (ii) with CC-CV charge at a charge current value of 0.2 C (where the terminal current condition was 0.02 C), and (iii) with CC discharge at a discharge current value of 0.2 C (where the value of an electric current at which a battery rated capacity defined as a one-hour rate discharge capacity was discharged in one hour was assumed to be 1 C; the same applies hereinafter). Note here that the "CC-CV charge" is a charging method in which (i) a battery is charged at a constant electric current set, (ii) after a certain voltage is reached, the certain voltage is maintained while the electric current is being reduced (the same applies hereinafter). Note also that the "CC discharge" is a discharging method in which a battery is discharged at a constant electric current until a certain voltage is reached (the same applies hereinafter).

2. Cycle Test

The nonaqueous electrolyte secondary batteries, which had been subjected to initial charge and discharge, were each subjected to 100 charge-discharge cycles at 55° C. Each of the 100 charge-discharge cycles was carried out (i) at a voltage ranging from 2.7 V to 4.2 V, (ii) with CC-CV charge at a charge current value of 1 C (where the terminal current condition was 0.02 C), and (iii) with CC discharge at a discharge current value of 10 C.

3. Test of Charge Recovery Capacity after 100 Cycles

The nonaqueous electrolyte secondary batteries, which had been subjected to 100 charge-discharge cycles, were each subjected to three charge-discharge cycles at 55° C. Each of the three charge-discharge cycles was carried out (i) at a voltage ranging from 2.7 V to 4.2 V, (ii) with CC-CV charge at a charge current value of 1 C (where the terminal current condition was 0.02 C), and (iii) with CC discharge at a discharge current value of 0.2 C. The charge capacity at the third cycle was divided by the weight of the positive electrode. The quotient was used as the charge recovery capacity after 100 cycles.

The charge recovery capacity test is a test for accurately determining the charge capacity after a battery is subjected to cycles and is then discharged at a low rate (0.2 C) until the battery is empty. The charge recovery capacity test is a test for determining how much the charge performance of a battery has degraded, in particular, how much the charge performance of an electrode has degraded.

(Respective Average Particle Diameters of Positive Electrode Active Material and Negative Electrode Active Material)

The volume-based particle size distribution and average particle diameter (D50) were measured with use of a laser diffraction particle size analyzer (product name: SALD2200, available from Shimadzu Corporation).

Example 1

[Production of Nonaqueous Electrolyte Secondary Battery Laminated Separator]

Ultra-high molecular weight polyethylene powder (GUR2024, available from Ticona Corporation) having a weight-average molecular weight of 4,970,000 and polyethylene wax (FNP-0115, available from Nippon Seiro Co., Ltd.) having a weight-average molecular weight of 1,000 were mixed for preparation of a mixture containing the ultra-high molecular weight polyethylene powder at a proportion of 68.0% by weight and the polyethylene wax at a proportion of 32.0% by weight. Assuming that the ultra-high molecular weight polyethylene powder and the polyethylene wax of the mixture had 100 parts by weight in total, to the 100 parts by weight of the mixture, 0.4 parts by weight of an antioxidant (Irg1010, available from Ciba Specialty Chemicals Corporation), 0.1 parts by weight of an antioxidant (P168, available from Ciba Specialty Chemicals Corporation), and 1.3 parts by weight of sodium stearate were added, and then calcium carbonate having a BET specific surface area of 11.8 $m^2/g$ (available from Maruo Calcium Co., Ltd.) was further added so as to account for 38% by volume of the entire volume of the resultant mixture. Then, the resultant mixture was mixed as it was, that is, in the form of powder, in a Henschel mixer, and thereafter the mixture was melted and kneaded with use of a twin screw kneading extruder. This produced a polyolefin resin composition.

Next, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 1.0% by weight of nonionic surfactant) having a temperature of 43° C. for removal of the calcium carbonate, and was then cleaned with water at 45° C. Subsequently, the sheet thus cleaned was stretched 6.2-fold at 100° C. with use of a tenter uniaxial stretching machine available from Ichikin Co., Ltd. This produced a porous film 1. The porous film 1 produced had a film thickness of 10.0 μm, a weight per unit area of 6.4 g/$m^2$, and a white index (WI) of 87.

An N-methyl-2-pyrrolidone (hereinafter referred to also as "NMP") solution (available from Kureha Corporation; product name: L #9305, weight-average molecular weight: 1,000,000) containing a PVDF-based resin (polyvinylidene fluoride-hexafluoropropylene copolymer) was prepared as a coating solution. The coating solution was applied by a doctor blade method to the porous film 1 so that the applied coating solution weighed 6.0 g per square meter of the PVDF-based resin in the coating solution.

The porous film, to which the coating solution had been applied, was immersed into 2-propanol while the coating film was wet with the solvent, and was then left to stand still at −10° C. for 5 minutes. This produced a laminated porous film 1. The laminated porous film 1 produced was further immersed into other 2-propanol while the laminated porous film 1 was wet with the above immersion solvent, and was then left to stand still at 25° C. for 5 minutes. This produced a laminated porous film 1a. The laminated porous film 1a produced was dried at 130° C. for 5 minutes. This produced a laminated separator 1 including a porous layer. Table 1 shows the results of evaluation of the laminated separator 1 produced.

[Preparation of Nonaqueous Electrolyte Secondary Battery]

(Positive Electrode Plate)

A positive electrode plate was obtained in which a layer of a positive electrode mix (a mixture of $LiNi_{0.5}Mn_{0.3}Co_{0.2}O_2$ having an average particle diameter (D50) of 4.5 μm based on a volume, an electrically conductive agent, and PVDF (at a weight ratio of 92:5:3)) was applied on one surface of a positive electrode current collector (aluminum foil). In the positive electrode plate thus obtained, a positive electrode active material layer had a porosity of 40%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 1.

(Negative Electrode Plate)

A negative electrode plate was obtained in which a layer of a negative electrode mix (a mixture of natural graphite having an average particle diameter (D50) of 15 μm based on a volume, styrene-1,3-butadiene copolymer, and sodium carboxymethyl cellulose (at a weight ratio of 98:1:1)) was applied on one surface of a negative electrode current collector (copper foil). In the negative electrode plate thus obtained, a negative electrode active material layer had a porosity of 31%.

The negative electrode plate was partially cut off so that a negative electrode active material layer was present in an area of 50 mm×35 mm and that this area was surrounded by an area with a width of 13 mm in which area no negative electrode active material layer was present. A portion thus cut was used as a negative electrode plate 1.

(Assembly of Nonaqueous Electrolyte Secondary Battery)

A nonaqueous electrolyte secondary battery was produced with use of the positive electrode plate 1, the negative electrode plate 1, and the laminated separator 1 by the method below.

In a laminate pouch, the positive electrode plate 1, the laminated separator 1 with the porous layer facing the positive electrode plate 1, and the negative electrode plate 1 were disposed (arranged) on top of one another so as to obtain a nonaqueous electrolyte secondary battery member 1. During this operation, the positive electrode plate 1 and the negative electrode plate 1 were arranged so that the positive electrode active material layer of the positive electrode plate 1 had a main surface that was entirely covered by the main surface of the negative electrode active material layer of the negative electrode plate 1.

Subsequently, the nonaqueous electrolyte secondary battery member 1 was put into a bag prepared in advance from a laminate of an aluminum layer and a heat seal layer. Further, 0.23 mL of nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery 1.

Then, measurements were made of the charge recovery capacity property that the nonaqueous electrolyte secondary battery 1 obtained by the above method had after 100 cycles. Table 1 shows the measurement results.

Example 2

[Production of Nonaqueous Electrolyte Secondary Battery Laminated Separator]

Ultra-high molecular weight polyethylene powder (GUR4032, available from Ticona Corporation) having a weight-average molecular weight of 4,970,000 and polyethylene wax (FNP-0115, available from Nippon Seiro Co., Ltd.) having a weight-average molecular weight of 1,000 were mixed for preparation of a mixture containing the ultra-high molecular weight polyethylene powder at a proportion of 70.0% by weight and the polyethylene wax at a proportion of 30.0% by weight. Assuming that the ultra-high molecular weight polyethylene powder and the polyethylene wax of the mixture had 100 parts by weight in total, to the 100 parts by weight of the mixture, 0.4 parts by weight of an antioxidant (Irg1010, available from Ciba Specialty Chemicals Corporation), 0.1 parts by weight of an antioxidant (P168, available from Ciba Specialty Chemicals Corporation), and 1.3 parts by weight of sodium stearate were added, and then calcium carbonate having a BET specific surface area of 11.6 $m^2/g$ (available from Maruo Calcium Co., Ltd.) was further added so as to account for 36% by volume of the entire volume of the resultant mixture. Then, the resultant mixture was mixed as it was, that is, in the form of powder, in a Henschel mixer, and thereafter the mixture was melted and kneaded with use of a twin screw kneading extruder. This produced a polyolefin resin composition.

Next, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 6.0% by weight of nonionic surfactant) having a temperature of 38° C. for removal of the calcium carbonate, and was then cleaned with water at 40° C. Subsequently, the sheet thus cleaned was stretched 6.2-fold at 105° C. with use of a tenter uniaxial stretching machine available from Ichikin Co., Ltd. This produced a porous film 2. The porous film 2 produced had a film thickness of 15.6 μm, a weight per unit area of 5.4 $g/m^2$, and a white index (WI) of 97.

A coating solution was applied to the porous film 2 as in Example 1. The porous film, to which the coating solution had been applied, was immersed into 2-propanol while the coating film was wet with the solvent, and was then left to stand still at 25° C. for 5 minutes. This produced a laminated porous film 2. The laminated porous film 2 produced was further immersed into other 2-propanol while the laminated porous film 2 was wet with the above immersion solvent, and was then left to stand still at 25° C. for 5 minutes. This produced a laminated porous film 2a. The laminated porous film 2a produced was dried at 65° C. for 5 minutes. This produced a laminated separator 2 including a porous layer. Table 1 shows the results of evaluation of the laminated separator 2 produced.

[Preparation of Nonaqueous Electrolyte Secondary Battery]

A nonaqueous electrolyte secondary battery was prepared by a method similar to the method for Example 1 except that the laminated separator 1 was replaced with the laminated separator 2. The nonaqueous electrolyte secondary battery thus prepared was used as a nonaqueous electrolyte secondary battery 2.

Then, measurements were made of the charge recovery capacity property that the nonaqueous electrolyte secondary battery 2 obtained by the above method had after 100 cycles. Table 1 shows the measurement results.

Example 3

[Production of Nonaqueous Electrolyte Secondary Battery Laminated Separator]

Ultra-high molecular weight polyethylene powder (GUR4032, available from Ticona Corporation) having a weight-average molecular weight of 4,970,000 and polyethylene wax (FNP-0115, available from Nippon Seiro Co., Ltd.) having a weight-average molecular weight of 1,000 were mixed for preparation of a mixture containing the ultra-high molecular weight polyethylene powder at a proportion of 71.5% by weight and the polyethylene wax at a proportion of 28.5% by weight. Assuming that the ultra-high molecular weight polyethylene powder and the polyethylene wax of the mixture had 100 parts by weight in total, to the 100 parts by weight of the mixture, 0.4 parts by weight of an antioxidant (Irg1010, available from Ciba Specialty Chemicals Corporation), 0.1 parts by weight of an antioxidant (P168, available from Ciba Specialty Chemicals Corporation), and 1.3 parts by weight of sodium stearate were added, and then calcium carbonate having a BET specific surface area of 11.8 $m^2/g$ (available from Maruo Calcium Co., Ltd.) was further added so as to account for 37% by volume of the entire volume of the resultant mixture. Then, the resultant mixture was mixed as it was, that is, in the form of powder, in a Henschel mixer, and thereafter the mixture was melted and kneaded with use of a twin screw kneading extruder. This produced a polyolefin resin composition.

Next, the polyolefin resin composition was rolled with use of a pair of rollers each having a surface temperature of 150° C. This produced a sheet of the polyolefin resin composition. This sheet was immersed in an aqueous hydrochloric acid solution (containing 4 mol/L of hydrochloric acid and 1.0% by weight of nonionic surfactant) having a temperature of 43° C. for removal of the calcium carbonate, and was then cleaned with water at 45° C. Subsequently, the sheet thus cleaned was stretched 7.0-fold at 100° C. with use of a tenter uniaxial stretching machine available from Ichikin Co., Ltd. This produced a porous film 3. The porous film 3 produced had a film thickness of 10.3 μm, a weight per unit area of 5.2 $g/m^2$, and a white index (WI) of 91.

A coating solution was applied to the porous film 3 as in Example 1. The porous film, to which the coating solution had been applied, was immersed into 2-propanol while the coating film was wet with the solvent, and was then left to stand still at −5° C. for 5 minutes. This produced a laminated porous film 3. The laminated porous film 3 produced was further immersed into other 2-propanol while the laminated porous film 3 was wet with the above immersion solvent, and was then left to stand still at 25° C. for 5 minutes. This produced a laminated porous film 3a. The laminated porous film 3a produced was dried at 30° C. for 5 minutes. This produced a laminated separator 3 including a porous layer. Table 1 shows the results of evaluation of the laminated separator 3 produced.

[Preparation of Nonaqueous Electrolyte Secondary Battery]

A nonaqueous electrolyte secondary battery was prepared by a method similar to the method for Example 1 except that the laminated separator 1 was replaced with the laminated separator 3. The nonaqueous electrolyte secondary battery thus prepared was used as a nonaqueous electrolyte secondary battery 3.

Then, measurements were made of the charge recovery capacity property that the nonaqueous electrolyte secondary battery 3 obtained by the above method had after 100 cycles. Table 1 shows the measurement results.

Example 4

(Positive Electrode Plate)

A positive electrode plate was obtained in which a layer of a positive electrode mix (a mixture of $LiCoO_2$ having an average particle diameter (D50) of 5 μm based on a volume, an electrically conductive agent, and PVDF (at a weight ratio of 97:1.8:1.2)) was applied on one surface of a positive electrode current collector (aluminum foil). In the positive electrode plate thus obtained, a positive electrode active material layer had a porosity of 20%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 2.

[Preparation of Nonaqueous Electrolyte Secondary Battery]

A nonaqueous electrolyte secondary battery was prepared by a method similar to the method for Example 1 except that the laminated separator 1 was replaced with the laminated separator 3 and that the positive electrode plate 2 was used as a positive electrode plate. The nonaqueous electrolyte secondary battery thus prepared was used as a nonaqueous electrolyte secondary battery 4.

Then, measurements were made of the charge recovery capacity property that the nonaqueous electrolyte secondary battery 4 obtained by the above method had after 100 cycles. Table 1 shows the measurement results.

Example 5

(Positive Electrode Plate)

A positive electrode plate was obtained in which a layer of a positive electrode mix (a mixture of $LiNi_{0.33}Mn_{0.33}Co_{0.33}O_2$ having an average particle diameter (D50) of 10 μm based on a volume, an electrically conductive agent, and PVDF (at a weight ratio of 100:5:3)) was applied on one surface of a positive electrode current collector (aluminum foil). In the positive electrode plate thus obtained, a positive electrode active material layer had a porosity of 34%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 3.

[Preparation of Nonaqueous Electrolyte Secondary Battery]

A nonaqueous electrolyte secondary battery was prepared by a method similar to the method for Example 1 except that the laminated separator 1 was replaced with the laminated separator 3 and that the positive electrode plate 3 was used as a positive electrode plate. The nonaqueous electrolyte secondary battery thus prepared was used as a nonaqueous electrolyte secondary battery 5.

Then, measurements were made of the charge recovery capacity property that the nonaqueous electrolyte secondary battery 5 obtained by the above method had after 100 cycles. Table 1 shows the measurement results.

Example 6

(Negative Electrode Plate)

A negative electrode plate was obtained in which a layer of a negative electrode mix (a mixture of artificial graphite having an average particle diameter (D50) of 22 μm based on a volume, styrene-1,3-butadiene copolymer, and sodium carboxymethyl cellulose (at a weight ratio of 98:1:1)) was applied on one surface of a negative electrode current collector (copper foil). In the negative electrode plate thus obtained, a negative electrode active material layer had a porosity of 35%.

The negative electrode plate was partially cut off so that a negative electrode active material layer was present in an area of 50 mm×35 mm and that this area was surrounded by an area with a width of 13 mm in which area no negative electrode active material layer was present. A portion thus cut was used as a negative electrode plate 2.

[Preparation of Nonaqueous Electrolyte Secondary Battery]

A nonaqueous electrolyte secondary battery was prepared by a method similar to the method for Example 1 except that the negative electrode plate 2 was used as a negative electrode plate and that the laminated separator 1 was replaced with the laminated separator 3. The nonaqueous electrolyte secondary battery thus prepared was used as a nonaqueous electrolyte secondary battery 6.

Then, measurements were made of the charge recovery capacity property that the nonaqueous electrolyte secondary battery 6 obtained by the above method had after 100 cycles. Table 1 shows the measurement results.

Example 7

[Preparation of Porous Layer and Nonaqueous Electrolyte Secondary Battery Laminated Separator]

In N-methyl-2-pyrrolidone, a PVDF-based resin (product name: "Kynar (registered trademark) LBG", available from Arkema Inc.; weight-average molecular weight of 590,000) was stirred and dissolved at 65° C. for 30 minutes so that the solid content was 10% by mass. The resulting solution was used as a binder solution. As a filler, fine alumina particles (product name: "AKP3000", available from Sumitomo Chemical Co., Ltd.; containing 5 ppm of silicon) was used. The fine alumina particles, the binder solution, and a solvent (N-methyl-2-pyrrolidone) were mixed together at the following ratio: The fine alumina particles, the binder solution, and the solvent were mixed together so that (i) the resulting mixed solution contained 10 parts by weight of the PVDF-based resin with respect to 90 parts by weight of the fine alumina particles and (ii) the solid content concentration (fine alumina particles+PVDF-based resin) of the mixed solution was 10% by weight. A dispersion solution was thus obtained. The coating solution prepared by the above method was applied by a doctor blade method to the porous film 3 produced in Example 3 so that the applied coating solution weighed 6.0 g per square meter of the PVDF-based resin in the coating solution. This produced a laminated porous film 4. The laminated porous film 4 was dried at 65° C. for 5 minutes. This produced a laminated separator 4. The drying operation involved hot air blown in an air direction perpendicular to the porous film 3 at an air velocity of 0.5 m/s. Table 1 shows the results of evaluation of the laminated separator 4 produced.

[Preparation of Nonaqueous Electrolyte Secondary Battery]

A nonaqueous electrolyte secondary battery was prepared by a method similar to the method for Example 1 except that the laminated separator 1 was replaced with the laminated separator 4. The nonaqueous electrolyte secondary battery thus prepared was used as a nonaqueous electrolyte secondary battery 7.

Then, measurements were made of the charge recovery capacity property that the nonaqueous electrolyte secondary battery 7 obtained by the above method had after 100 cycles. Table 1 shows the measurement results.

Comparative Example 1

[Preparation of Nonaqueous Electrolyte Secondary Battery]
[Preparation of Nonaqueous Electrolyte Secondary Battery Laminated Separator]

A porous film to which a coating solution had been applied as in Example 3 was immersed into 2-propanol while the coating film was wet with the solvent, and was then left to stand still at −78° C. for 5 minutes. This produced a laminated porous film 5. The laminated porous film 5 produced was further immersed into other 2-propanol while the laminated porous film 5 was wet with the above immersion solvent, and was then left to stand still at 25° C. for 5 minutes. This produced a laminated porous film 5a. The laminated porous film 5a produced was dried at 30° C. for 5 minutes. This produced a laminated separator 5. Table 1 shows the results of evaluation of the nonaqueous electrolyte secondary battery laminated separator 5 produced.

[Preparation of Nonaqueous Electrolyte Secondary Battery]

A nonaqueous electrolyte secondary battery was prepared by a method similar to the method for Example 1 except that the laminated separator 1 was replaced with the laminated separator 5. The nonaqueous electrolyte secondary battery thus prepared was used as a nonaqueous electrolyte secondary battery 8.

Then, measurements were made of the charge recovery capacity property that the nonaqueous electrolyte secondary battery 8 obtained by the above method had after 100 cycles. Table 1 shows the measurement results.

Comparative Example 2

(Positive Electrode Plate)

A positive electrode plate was obtained in which a layer of a positive electrode mix (a mixture of $LiMn_2O_4$ having an average particle diameter (D50) of 8 μm based on a volume, an electrically conductive agent, and PVDF (at a weight ratio of 100:5:3)) was applied on one surface of a positive electrode current collector (aluminum foil). In the positive electrode plate thus obtained, a positive electrode active material layer had a porosity of 51%.

The positive electrode plate was partially cut off so that a positive electrode active material layer was present in an area of 45 mm×30 mm and that this area was surrounded by an area with a width of 13 mm in which area no positive electrode active material layer was present. A portion thus cut was used as a positive electrode plate 4.

[Preparation of Nonaqueous Electrolyte Secondary Battery]

A nonaqueous electrolyte secondary battery was prepared by a method similar to the method for Example 1 except that the positive electrode plate 4 was used as a positive electrode plate and that the laminated separator 1 was replaced with the laminated separator 3. The nonaqueous electrolyte secondary battery thus prepared was used as a nonaqueous electrolyte secondary battery 9.

Then, measurements were made of the charge recovery capacity property that the nonaqueous electrolyte secondary battery 9 obtained by the above method had after 100 cycles. Table 1 shows the measurement results.

Comparative Example 3

(Negative Electrode Plate)

A negative electrode plate was obtained in which a layer of a negative electrode mix (a mixture of artificial spherocrystal graphite having an average particle diameter (D50) of 34 μm based on a volume, an electrically conductive agent, and PVDF (at a weight ratio of 85:15:7.5)) was applied on one surface of a negative electrode current collector (copper foil). In the negative electrode plate thus obtained, a negative electrode active material layer had a porosity of 59%.

The negative electrode plate was partially cut off so that a negative electrode active material layer was present in an area of 50 mm×35 mm and that this area was surrounded by an area with a width of 13 mm in which area no negative electrode active material layer was present. A portion thus cut was used as a negative electrode plate 3.

[Preparation of Nonaqueous Electrolyte Secondary Battery]

A nonaqueous electrolyte secondary battery was prepared by a method similar to the method for Example 1 except that the negative electrode plate 3 was used as a negative electrode plate and that the laminated separator 1 was replaced with the laminated separator 3. The nonaqueous electrolyte secondary battery thus prepared was used as a nonaqueous electrolyte secondary battery 10.

Then, measurements were made of the charge recovery capacity property that the nonaqueous electrolyte secondary battery 10 obtained by the above method had after 100 cycles. Table 1 shows the measurement results.

TABLE 1

| | Porous layer PVDF α rate (mol %) | Positive electrode plate \|1−TD/MD\| | Negative electrode plate \|1−TD/MD\| | Nonaqueous electrolyte secondary battery Charge recovery capacity after 100 cycles (mAh/g) |
|---|---|---|---|---|
| Example 1 | 59.6 | 0.33 | 0.10 | 140 |
| Example 2 | 80.8 | 0.33 | 0.10 | 146 |
| Example 3 | 44.4 | 0.33 | 0.10 | 130 |

TABLE 1-continued

| | Electrode plate | | Nonaqueous electrolyte secondary battery |
| --- | --- | --- | --- |
| | Porous layer PVDF α rate (mol %) | Positive electrode plate \|1−TD/MD\| | Negative electrode plate \|1−TD/MD\| | Charge recovery capacity after 100 cycles (mAh/g) |
| Example 4 | 44.4 | 0.47 | 0.10 | 129 |
| Example 5 | 44.4 | 0.04 | 0.10 | 130 |
| Example 6 | 44.4 | 0.33 | 0.49 | 140 |
| Example 7 | 64.3 | 0.33 | 0.10 | 138 |
| Comparative Example 1 | 34.6 | 0.33 | 0.10 | 121 |
| Comparative Example 2 | 44.4 | 0.54 | 0.10 | 58 |
| Comparative Example 3 | 44.4 | 0.33 | 0.53 | 121 |

CONCLUSION

Table 1 shows that the nonaqueous electrolyte secondary batteries produced in Examples 1 to 7 were superior to the nonaqueous electrolyte secondary batteries produced in Comparative Examples 1 to 3 in terms of the charge capacity property after cycles. The nonaqueous electrolyte secondary batteries produced in Examples 1 to 7 each had a charge recovery capacity of not less than 125 mAh/g after 100 cycles.

Table 1 therefore proves that a nonaqueous electrolyte secondary battery that meets requirement (i) of the polyvinylidene fluoride-based resin contained in the porous layer containing an α-form polyvinylidene fluoride-based resin in an amount of not less than 35.0 mol % with respect to 100 mol % of the combined amount of the α-form polyvinylidene fluoride-based resin and a β-form polyvinylidene fluoride-based resin both contained in the polyvinylidene fluoride-based resin, requirement (ii) of the positive electrode plate having a value represented by |1−T/M| which value is not less than 0.00 and not more than 0.50, and requirement (iii) of the negative electrode plate having a value represented by |1−T/M| which value is not less than 0.00 and not more than 0.50 enjoys improvement in the charge recovery capacity property that the nonaqueous electrolyte secondary battery has after cycles.

INDUSTRIAL APPLICABILITY

A nonaqueous electrolyte secondary battery in accordance with an embodiment of the present invention is suitable for use as (i) a battery for use in devices such as a personal computer, a mobile telephone, and a portable information terminal and (ii) an on-vehicle battery.

REFERENCE SIGNS LIST

1 Diamond indenter
2 Substrate (glass preparation)
3 Measurement target (positive electrode plate or negative electrode plate)

The invention claimed is:

1. A nonaqueous electrolyte secondary battery, comprising:
    a nonaqueous electrolyte secondary battery separator including a polyolefin porous film;
    a porous layer containing a polyvinylidene fluoride-based resin;
    a positive electrode plate; and
    a negative electrode plate,
    the positive electrode plate having a value represented by Formula (1) below which value is not less than 0.00 and not more than 0.50,
    the negative electrode plate having a value represented by Formula (1) below which value is not less than 0.00 and not more than 0.50, $$|1-T/M| \qquad (1)$$

where T represents a critical load distance in a TD in a scratch test under a constant load of 0.1 N, and M represents a critical load distance in an MD in a scratch test under a constant load of 0.1 N,
    the porous layer being between (i) the nonaqueous electrolyte secondary battery separator and (ii) at least one of the positive electrode plate and the negative electrode plate,
    the polyvinylidene fluoride-based resin containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin both contained in the polyvinylidene fluoride-based resin,
    the amount of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum.

2. The nonaqueous electrolyte secondary battery according to claim 1, wherein the positive electrode plate contains a transition metal oxide.

3. The nonaqueous electrolyte secondary battery according to claim 1, wherein the negative electrode plate contains a graphite.

4. The nonaqueous electrolyte secondary battery according to claim 1, further comprising:
    another porous layer which is provided between (i) the nonaqueous electrolyte secondary battery separator and (ii) at least one of the positive electrode plate and the negative electrode plate.

5. The nonaqueous electrolyte secondary battery according to claim 4, wherein the another porous layer contains at least one resin selected from the group consisting of a polyolefin, a meth acrylate-based resin, an acrylate-based resin, a fluorine-containing resin excluding a polyvinylidene fluoride-based resin, a polyamide-based resin, a polyester-based resin, and a water-soluble polymer.

6. The nonaqueous electrolyte secondary battery according to claim 5, wherein the polyamide-based resin is aramid resin.

* * * * *